United States Patent
Kuzbari et al.

(10) Patent No.: US 10,969,469 B2
(45) Date of Patent: Apr. 6, 2021

(54) TRACKING SYSTEM

(71) Applicant: NOVUS COMMUNICATIONS LTD, Grand Cayman (KY)

(72) Inventors: Safwan Kuzbari, Dubai (AE); Jamaleddine Nassar, Dubai (AE)

(73) Assignee: NOVUS COMMUNICATIONS LTD, Grand Cayman (KY)

( * ) Notice: Subject to any disclaimer, the term of this patent is extended or adjusted under 35 U.S.C. 154(b) by 109 days.

(21) Appl. No.: 16/308,167

(22) PCT Filed: Jun. 8, 2017

(86) PCT No.: PCT/GB2017/051674
§ 371 (c)(1),
(2) Date: Dec. 7, 2018

(87) PCT Pub. No.: WO2017/212283
PCT Pub. Date: Dec. 14, 2017

(65) Prior Publication Data
US 2019/0302231 A1    Oct. 3, 2019

(30) Foreign Application Priority Data

Jun. 8, 2016 (GB) ...................................... 1610028

(51) Int. Cl.
| | | |
|---|---|---|
| *G01S 7/40* | (2006.01) | |
| *G01S 13/75* | (2006.01) | |
| *G01S 5/02* | (2010.01) | |
| *G01S 3/46* | (2006.01) | |
| *G01S 5/00* | (2006.01) | |

(52) U.S. Cl.
CPC ..................... *G01S 7/40* (2013.01);
*G01S 3/46* (2013.01); *G01S 5/0081* (2013.01);
*G01S 5/021* (2013.01);
(Continued)

(58) Field of Classification Search
CPC .... G01S 13/75; G01S 2007/4082; G01S 3/46; G01S 5/0081; G01S 5/021; G01S 5/0252;
(Continued)

(56) References Cited

U.S. PATENT DOCUMENTS

| | | |
|---|---|---|
| 2004/0061646 A1 | 4/2004 | Andrews et al. |
| 2005/0046608 A1 | 3/2005 | Schantz et al. |

(Continued)

FOREIGN PATENT DOCUMENTS

| | | |
|---|---|---|
| EP | 2662703 A1 | 11/2013 |
| TW | 201200892 A | 1/2012 |

(Continued)

OTHER PUBLICATIONS

Aug. 28, 2017—PCTGB2017051674—ISR & WO.
Dec. 7, 2016—GB1610028.1—Search Report.

*Primary Examiner* — Timothy X Pham
(74) *Attorney, Agent, or Firm* — Banner & Witcoff, Ltd.

(57) ABSTRACT

Method and system for calibrating a tag location system comprising the steps of placing one or more test radio frequency RF, communication circuits at known locations within a space to be calibrated. Receiving a signal from each one of the test RF communication circuit. Determining a property of each received signal, wherein the determined property is associated with the known location of the test RF communication circuit that generated the signal. Generating a model of the calibrated space from the determined properties of the each received signal and associated known locations, wherein the model provides an output indicating the location of a signal-producing tag based on signals received from the test RF communication circuits and associated known locations.

17 Claims, 12 Drawing Sheets

(52) U.S. Cl.
CPC .......... *G01S 5/0252* (2013.01); *G01S 5/0278*
(2013.01); *G01S 13/75* (2013.01); *G01S 2007/4082* (2013.01)

(58) Field of Classification Search
CPC ........ G01S 5/0278; G01S 7/40; G01S 5/0236;
G06T 2207/30192; G06T 5/001; G06T 5/40; H04W 4/029; H04W 4/33
USPC ............................ 342/169; 340/539; 455/457
See application file for complete search history.

(56) References Cited

U.S. PATENT DOCUMENTS

| | | |
|---|---|---|
| 2005/0285792 A1 | 12/2005 | Sugar et al. |
| 2006/0082444 A1* | 4/2006 | Sweeney, II ......... G06Q 10/087 340/10.3 |
| 2007/0266782 A1* | 11/2007 | Bartz ................... G06Q 10/087 73/156 |
| 2010/0039929 A1 | 2/2010 | Cho et al. |
| 2010/0079238 A1 | 4/2010 | Kelly et al. |
| 2011/0090081 A1* | 4/2011 | Khorashadi ........... G01S 5/0252 340/539.13 |
| 2012/0015665 A1 | 1/2012 | Farley et al. |
| 2014/0062792 A1 | 3/2014 | Schantz et al. |
| 2015/0350845 A1 | 12/2015 | Patel et al. |

FOREIGN PATENT DOCUMENTS

| | | |
|---|---|---|
| WO | 01/06401 A1 | 1/2001 |
| WO | 2007/106972 A1 | 9/2007 |
| WO | 2014/203041 A1 | 12/2014 |
| WO | 2016/065314 A1 | 4/2016 |

* cited by examiner

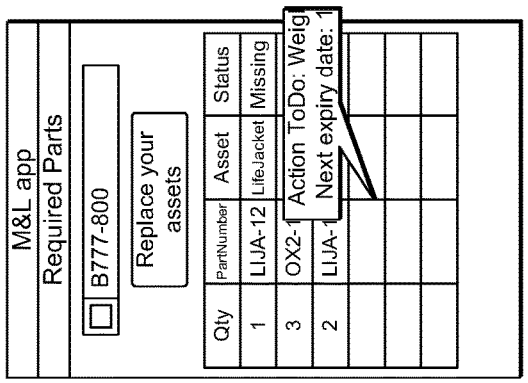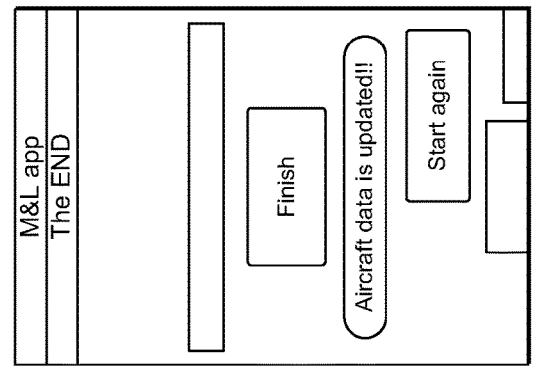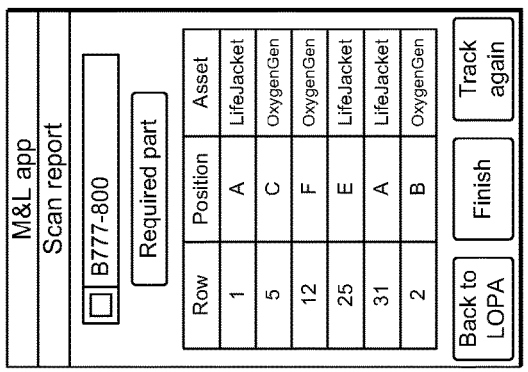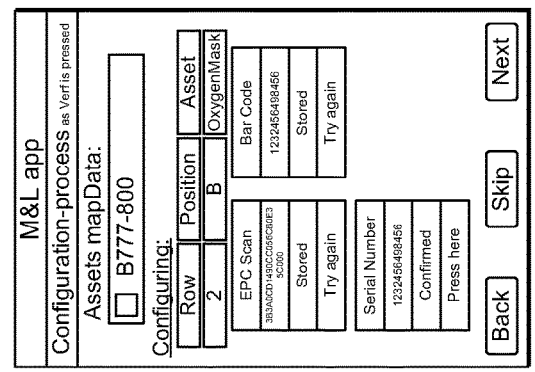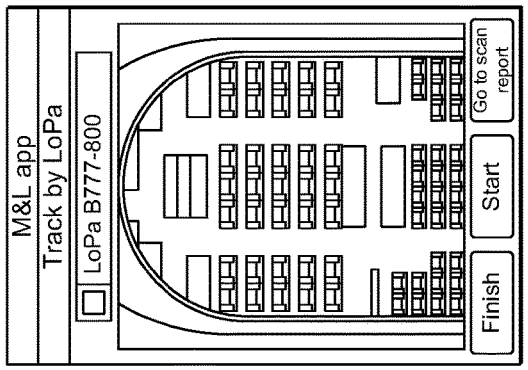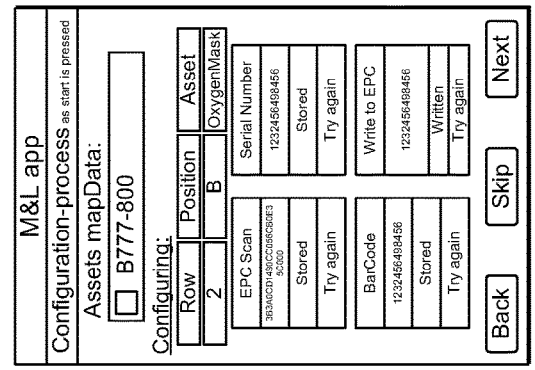
FIG. 10 Cont'd

TRACKING SYSTEM

CROSS-REFERENCE TO RELATED APPLICATIONS

This application is a U.S. National Stage application under 35 U.S.C. § 371 of International Application PCT/GB2017/051674 (published as WO 2017/212283), filed Jun. 8, 2017, which claims the benefit of priority to Application GB 1610028.1, filed Jun. 8, 2016. Benefit of the filing date of each of these prior applications is hereby claimed. Each of these prior applications is hereby incorporated by reference in its entirety.

FIELD OF THE INVENTION

The present invention relates to a system for tracking items using electronic tags and in particular, a system including tags and a tag reader (e.g. RFID tags).

BACKGROUND OF THE INVENTION

It is important to be able to locate and track items, especially as they travel between places. Objects may travel within a single facility or move over greater distances or even transit between countries over land, sea and air. Such items may include freight, post, documents and individual parts of vehicles such as ships, trains and aircraft, for example. Passive electronic tags (e.g. RFID tags) may be attached to individual items so that they may be uniquely identified and interrogated locally at distances of between several millimetres and perhaps up to ten metres. Typically, tags are passive and have no stored electrical energy and so derive their required electrical power from an interrogating signal generated by a tag reader. Therefore, items and goods may be tracked as they pass particular points on a journey or between locations, provided that they pass sufficiently close to a tag reader (i.e. within a short interrogation and reception range). This can work well for freight, which has to follow a particular route with well-defined stops or freight depots. However, for items that travel on less defined routes or that do not have a particular end destination (e.g. parts of aircraft that are in constant use within the aircraft) then passive tags have drawbacks.

Active tags that carry their own power supply can be used to track larger items, such as freight containers. Such tags may have a large battery, a long-range wireless interface (e.g. a GSM radio or satellite communicator) and a position locator such as GPS or GSM triangulation unit. However, once the battery is exhausted then the tag ceases to function and the item will no longer be locatable. Furthermore, such tracking devices are only suitable for larger items due to their size and bulk.

US 2010/0079238 describes an RF-based tag that includes non-volatile memory and a piezo electric sensor. The piezo electric sensor produces an electrical charge that momentarily supplies electrical power to the tag when subjected to a mechanical force. This electrical power is sufficient to record data in the non-volatile memory. Therefore, such a tag can record events that occur during a journey and the non-volatile memory can be read at the end of such a journey to provide additional information. However, such a tag cannot be used to locate items at longer distances.

It is often important to be able to locate individual parts of a vehicle, such as an aircraft. For example, should an aircraft be leased then certain parts may be swapped or replaced during the leasing period. When the aircraft is returned to its owner, then all of the parts must be accounted for. This can be important for regulatory and safety purposes or to audit the number of hours that particular parts have been used so that they can be replaced or serviced appropriately. Furthermore, it can be found that parts are swapped between individual aircraft within a fleet. When those aircraft are returned to their owner or passed on to a new carrier, then again, the original parts must be returned to the original aircraft. In order to track such movements and changes, then significant effort and paperwork may be required to locate missing or moved parts.

Similarly, valuable items such as jewelry and important documents may be transported and moved in use. It is usually not feasible to provide such small items with active global tracking systems due to the added bulk. However, small but valuable items can be lost or misplaced more easily and so it is useful to know their whereabouts at any given time, which is not currently feasible.

Furthermore, it may be important to be able to accurately locate items within a space or location. For example, a stock room may contain many tagged items but it may not be easy to locate any particular individual item quickly.

Therefore, there is required a method and system that overcomes these problems.

SUMMARY OF THE INVENTION

According to a first aspect, there is provided a method for calibrating a tag location system comprising the steps of:

placing one or more test radio frequency, RF, communication circuits at known locations within a space to be calibrated;

receiving a signal from each one of the test RF communication circuit;

determining a property of each received signal, wherein the determined property is associated with the known location of the test RF communication circuit that generated the signal; and generating a model of the calibrated space from the determined properties of the each received signal and associated known locations, wherein the model provides an output indicating the location of a signal-producing tag based on signals received from the test RF communication circuits and associated known locations. Therefore, a space, location or area may be analysed and calibrated so that tags or items attached to tags may be located more accurately and efficiently. The space is interrogated using test signals. The location of the source of these test signals are known and associated with the received signals. This may be by using tag identifiers (IDs) within the signals, for example. The test signals may be provided and received simultaneously or individually. There may be more than one receiver to improve accuracy. The receiver or receivers may be moved to different receiving locations to increase the data set and accuracy. The test RF communication circuits may also be moved and the process repeated to further increase the number of data points and accuracy. The location of the receivers may also be taken into account in forming the model or generating a calculated location of a tag. The same or different antennas may be used to receive the signals from the tags or test RF communication circuits as those that transfer an RF signal and receive a back-scattered or response signal (e.g. an RFID interrogation and response).

Optionally, the property of the received signal may be any one or more of signal strength, amplitude, received signal strength indicator (RSSI), frequency, polarisation, and/or angle of arrival (AoA). Other signal properties may be used.

Preferably, the signal may be received from one or more tag readers. This reduces the time taken to calibrate a space. Optionally, the signal may be received from more than one tag reader at different times and/or at predetermined times or during defined time slots.

Optionally, the method may further comprise the step of determining a location of the one or more tag readers when the signal is received. This enables the location of the tag (or tags) to be determined more accurately.

Optionally, the determined location may be determined relative to a known location. Alternatively, the location may be arbitrary.

Optionally, the location of the one or more tag readers may be determined from one or more sensors within the one or more tag readers. This allows the position of the tag reader to be taken into consideration when calculating or calibrating the locations of the tag or tags (or items attached to the tags).

Optionally, the one or more sensors are any one or more of an accelerometer and/or gyroscope. Other sensors may be used.

Optionally, the method may further comprise the step of moving each one or more tag readers and receiving signals from the one or more test RF communication circuits after each move.

Advantageously, the location of the one or more tag readers is determined during or after the moving step. Therefore, a single tag reader can act as a second or multiple tag readers (or antennas). This means that tags can be read and calibrated over a wider area and/or with increased accuracy.

Advantageously, the method may further comprise repeating the receiving, determining and generating steps after changes have occurred within the calibration space. For example, if items within the space move, are added or are removed then this may affect signal propagation and so recalibration may be required.

Preferably, generating the model may include one or more machine learning algorithms. Other types of processing may be used, e.g. triangulation.

Optionally, the machine learning algorithm may be any one or more selected from: Bayesian classification, linear regression, logistic regression, neural networking and support vector machine. Other machine learning techniques may be used. The machine learning algorithm may use one or more different signal properties and may be refined or use additional signal properties as they become available, for example. The processing may take place within a dedicated, CPU, CPUs, GPU or GPUs or within cloud or virtual servers, for example.

According to a second aspect, there is provided a method for locating a tag having a radio frequency, RF, communication circuit configured to produce a signal, the method comprising the steps of:

receiving from the tag a signal;

determining one or more signal properties of the received signal;

providing the one or more determined signal properties as an input to a calibration model generated according to any method described above; and generating an output using the model, the output indicating the location of the tag. Therefore, the calibration model can be used (e.g. to audit or check for the presence of tags and items attached to the tags).

Optionally, the signal from the tag may be received at more than one location by one or more tag readers.

Optionally, the method may further comprise the step of determining a location of the one or more tag readers when the signal is received.

Optionally, the determined location may be determined relative to a known location.

Preferably, the location of the one or more tag readers may be determined from one or more sensors within the one or more tag readers.

Optionally, the one or more sensors may be any one or more of accelerometer and gyroscope. The same (or a similar) tag reader can generate the calibration model and read the tag or tags based on the generated calibration model.

Optionally, the method may further comprise the step of moving the one or more tag readers and receiving signals from the tag after each move.

Preferably, the location of the one or more tag readers is determined during or after the moving step. The location of each tag reader may preferably be monitored and determined in real time or only when the signals from the tags are received.

Preferably, the signal may be received at more than one location using a plurality of tag readers.

According to a third aspect, there is provided a tracking system comprising:

one or more tag readers, each tag reader comprising an antenna configured to receive a radio frequency, RF, signal and determine one or more properties of each received signal;

one or more radio frequency, RF, communication circuits configured to generate a signal to be received by the one or more tag readers;

one or more processors;

and memory storing instructions causing the one or more processors to:

generate a calibration model of a space from the determined one or more properties of the each received signal and associated known locations of the RF communication circuits, wherein the model provides an output indicating the location of a tag based on signals received from the test RF communication circuits and associated known locations.

Preferably, the instructions may further cause the one or more processors to:

provide one or more further determined signal properties from a tag signal as an input to the calibration model; and generate an output using the calibration model, the output indicating the location of the tag. In other words, the calibration model may be used to located tags with unknown locations.

Preferably, the system may further comprise:

a database configured to store the determined locations of tags and/or associated items attached to the tags.

Advantageously, the system may further comprise a network or internet interface configured to receive a query identifying a tag or item attached to the tag and in response provide a location of the tag or associated item.

Preferably, the system may further comprise a mobile device configured to receive an input indicating the location of the tag. The mobile device may include a mobile application. The mobile device may include or be in communication with (e.g. wirelessly, Bluetooth, etc.) a tag reader or interrogator, and/or antenna or antennas. In other words, the tag reader, antenna, and mobile device may be separate items or combined as a single device.

Advantageously, the system may further comprise a server configured to provide data indicating aircraft layouts to the mobile device, wherein the input indicating the location of the tag corresponds with a location within the aircraft layout. The data may be stored within a database. The server may be in communication with the mobile device wirelessly (e.g. Bluetooth, WiFi, cellular communication, etc.) and/or over the internet.

Preferably, the server may be further configured to store the location of one or more tags. These may be associated with tag identifiers (e.g. unique identifies), locations within a predetermined layout of a vehicle, structure or aircraft. These data may also include expiry dates of items attached to the tags, for example.

Preferably, the one or more tag readers may further comprise one or more sensors configured to generate data indicating a location or movement of the tag reader. Each tag reader may Optionally, the one or more sensors may be any one or more of an accelerometer and/or gyroscope (or others).

Optionally, the instructions may further cause the one or more processors to determine the location of the one or more tag readers from the generated data when the signal is received.

Optionally, the determined location may be determined relative to a known location.

Optionally, the location of the one or more tag readers may be determined during and/or after the tag reader is moved to a new location.

In one example implementation the tracking system may include an interrogator or reader that is typically in close proximity (e.g. up to a radius of 12 m or up to a radius of 100 m) from one or more tags or network of tags. Each tag can receive a signal from the reader and send a signal in response or may send data at intervals (regular or otherwise) in the absence of any interrogating signal. The signal from the reader may be used to provide power to the tag and/or may be absent of any data (or may not in itself cause any response, for example). For example, the signal or response may be the tag's unique identifier or may include other data that is received and processed by the reader. The tag is powered by a mechanical energy harvester, which generates at least sufficient energy to send the data to the reader (and to receive any interrogating signal where used or in range). This energy may be optionally stored, for instance, using a battery, storage unit, capacitor, super capacitor or solid state device. A plurality of tags may operate in this way. Advantageously, the tags may have a timer or operate intermittently (e.g. on for one minute and then sleep for one hour or longer or other periods) to converse energy or to allow enough energy to be harvested for a brief operation. The tags may form an energy harvesting wireless sensor network (EHWSN). The tag may be read without requiring a direct line of sight.

The reader may store the information for later retrieval or may be in communication with a central server using a network such as a cellular network, a satellite network or other long-range wireless network. The reader and one or more tags may be placed within a vehicle such as an aircraft or ship and the tags may be attached to or within items within the vehicle (e.g. goods in transit) or parts of the vehicle itself. Therefore, the overall system allows many different items may be tracked more reliably over long distances without requiring large batteries in each tag to power a long range transceiver (i.e. for communicating directly with the central server).

In accordance with an example implementation there is provided a tracking system comprising:
    a tag reader comprising an interrogating antenna;
    one or more tags (e.g. one or more electronic tags or radio frequency identification (RFID) tags) comprising:
        a mechanical to electrical energy converter configured to generate electrical energy;
        a radio frequency, RF, communication circuit; and
        a controller configured to:
            use the electrical energy generated by the mechanical to electrical energy converter to transmit a data signal to the tag reader (e.g. RFID tag reader) using the RF communication circuit.

The mechanical electrical generator allows tags to gain enough electrical energy to respond to interrogating signals by a reader (or simply to send the data) at greater distances and more reliably without requiring bulky batteries (or a very large interrogating signal), as electrical energy can be generated in transit or as the tag is moved. The tag reader may comprise a receiver (or transceiver) for receiving the data signal from the tag and an interface for communicating at longer distances (e.g. greater than 100 m or 1 km) to provide a different entity with the gathered tag data. The RF communication circuit may use a wireless fidelity protocol. The tag may further comprise an RF to electrical energy harvesting module for empowering purposes. The mechanical energy may be derived from acoustic energy, for example. Mechanical energy may include any movement type, including vibration, motion, and acoustic energy (at any or specific frequency or frequency range). The tag may also include an RF to DC circuit that may provide additional or alternative power (e.g. for load, sensors, control circuit, communication circuit, and/or WiFi transmitter, for example). The tag may also use the RF to electrical energy converter to transmit the data signal to the tag reader using the RF communication circuit. Other tags or tag readers may be used.

Advantageously, the tag reader may further comprise a wireless network interface, the tracking system further comprising:
    a receiving server configured to receive data from the wireless network interface of the tag reader, the received data including information associated with the data signal (or response to an interrogating signal) from the tag. Therefore, the system can more effectively report the locations or other information about items (e.g. in transit). The reader may be powered by a vehicle's power supply (for example) but the tags only need a small amount of energy (provided by mechanical movement) to send the data (and/or respond to interrogation requests), which may then result in this information being sent back to a central location (or cloud-based server). In this way, a large number of items can be tracked over large distances and long time frames (e.g. months or years). Preferably, the tag or tags travel or move together with the tag reader (e.g. within the same enclosure, vehicle, box, device, and/or they are local to each other) and the receiving server is remote from the combination of tag reader and tag(s). In other words, the tags communicate with the reader using one transmission protocol (e.g. a short range or lower power protocol) and the reader communicates with the central server using another different transmission protocol (e.g. long range or higher power protocol).

Preferably, the tracking system may further comprise a database configured to store the received data. The database may be centrally located (e.g. a physical server), cloud based or split between locations (e.g. local to the reader and server).

Preferably, the receiving server may be configured to send a request to the tag reader and the data is received in response to the request. Alternatively, the receiving server may receive ad hoc or regular signals from the tag reader or readers.

Optionally, the wireless network interface may be a cellular interface, a satellite interface, a Wi-Fi interface or an 802.11 interface. Other wireless network interfaces may be used.

Advantageously, the tag may further comprise an energy storage device configured to store electrical energy provided by the mechanical to electrical energy converter and to supply the stored electrical energy for use by the controller and RF communication circuit (e.g. transmitter or transceiver). Therefore, excess energy can be stored for use when an interrogating signal is received but when there is no mechanical movement to generate power for the transmitter and/or controller. The tag may be an electronic tag, RFID tag or other type of tag, for example.

Preferably, the data signal (and/or response) may include a unique identifier of the tag. However, other information may be included.

Advantageously, the RF communication circuit of the tag may be a transceiver and the tag reader may be configured to send an interrogating signal to the tag reader and further wherein the tag may be configured to transmit the data signal to the tag reader in response to the interrogating signal.

Optionally, the tag may be further configured to generate from the interrogating signal electrical energy to power the RF communication circuit and the controller. This electrical energy may be in addition to the mechanically generated power.

According to a further example implementation, there is provided a tag comprising: a mechanical to electrical energy converter configured to generate electrical energy; a radio frequency, RF, communication circuit; and
 a controller configured to use the electrical energy generated by the mechanical to electrical energy converter to transmit a data signal to the tag reader using the RF communication circuit. The communication circuit may use any frequency or band and especially those licensed for use in the particular country or countries that the tag is to be used in. Other types of tags or RFID tags may be used.

Optionally, the tag may further comprise an energy storage device configured to store electrical energy provided by the mechanical to electrical energy converter and to supply the stored electrical energy for use by the controller and RF communication circuit.

Optionally, the energy storage device may be a capacitor or a secondary battery. Other energy storage devices may be used.

Advantageously, the tag may further comprise one or more sensors and wherein the controller is further configured to include data generated by the one or more sensors in the data signal.

Preferably, the tag may further comprise a memory store configured to store the data generated by the one or more sensors. The memory may be a non-volatile memory (e.g. FLASH memory) and may store the data until next in communication with the RFID reader and/or at a particular time or location.

Optionally, the one or more sensors measure may be any one or more of: humidity, vibration, movement, motion, acceleration (an accelerometer), gyroscope, GPS, temperature, light or sound. Other sensors or peripherals may be included. Any one or more of the sensors may be formed from MEMS.

Optionally, the controller may comprise an electrical circuit, a microprocessor, and/or computer software or firmware. Any or all of the components of the tag may be incorporated within the same circuit, board or package or be separate.

Optionally, the communication circuit may be a transceiver (i.e. transmit and receive rather than only transmit) and the controller may be further configured to receive an interrogating signal from the tag reader and to transmit the data signal to the RFID tag reader in response to the interrogating signal.

Preferably, the tag may further comprise an antenna electrically connected to the RF communication circuit. The antenna may be integrated (with the controller or other circuit), internal to a package or external. The antenna may be a loop, dipole, uni-directional or multi-directional. There may be multiple antennas (e.g. two, three, four or more) that may each be optimised for a particular orientation so that the tag can receive and/or transmit data and/or be used and receive RF power in any orientation.

Optionally, the tag may further comprise an electrical circuit configured to convert a signal received by the antenna into electrical energy to power the RF communication circuit and the controller. This may be the same or a separate antenna to that receiving and transmitting a response to the interrogating signal.

Optionally, the controller may be further configured to power the RF communication circuit intermittently. This may save power and/or bandwidth or may also avoid interference from multiple tags operating simultaneously.

Optionally, the mechanical to electrical energy converter may be a piezo generator. Other types of generator may be used including spring and magnetic generators.

Preferably, the tag may further comprise an enclosure. This may be a case or potting compound, for example. Plastics, resin, metal, composite or other materials may be used.

Preferably, the enclosure may weatherproof, dust proof, solvent resistant, and/or heat or cold resistant. This allows the tag to operate in different types of hostile environments.

Optionally, the tag may be formed from a PCB board. The tag may be flexible or formed from a resilient material such as a plastics or rubber material. An enclosure may be provided to the tag. The printed circuit board (PCB) for the tag may be formed to be flexible and/or elastic. The PCB may be formed from multiple mini boards. The PCB may have a flat cable or be a flexible PCB board. The PCB or tag may also be formed to take the shape of the tagged object.

In accordance with further example implementation, there is provided a tag that uses at least two different sources on energy. These sources of energy (used to generate electrical power) may be selected from any two of: solar, mechanical (including acoustic, vibration, translation in any one or more dimensions), electromagnetic, radio frequency, battery or capacitor. Such a tag may selectively switch between sources of energy (e.g. automatically, as sources become available and/or to protect against over and under power events). The sources of energy may be merged, stored or used as they are generated. The at least two sources of energy are used to power a controller and RF transmitter or transceiver. The tag may be used to respond to an interrogating signal and/or provide a data signal at intervals in the same or similar way to that described with regards to other tags in this description. The tag may be used with any or all tag readers described in this description.

Preferably, the tag may further comprise an RF to DC conversion circuit. This may convert an RF signal (e.g. received by one or more antennas) and generate electrical power from it for storage or immediate use.

In accordance with a further example implementation, there is provided a tracking system comprising:

a tag reader comprising an interrogating antenna;

one or more tags (e.g. one or more electronic tags or radio frequency identification (RFID) tags) comprising:

a radio frequency (RF) to electrical energy converter configured to generate electrical energy;

a radio frequency, RF, communication circuit; and a controller configured to:

use the electrical energy generated by the RF energy converter to transmit a data signal to the tag reader (e.g. RFID tag reader) using the RF communication circuit. Additional electrical energy may be provided by using a mechanical to electrical energy converted and/or a solar energy converter (e.g. photovoltaic). The tracking system may further comprise a receiving server configured to receive data from the wireless network interface of the tag reader, the received data including information associated with the data signal (or response to an interrogating signal) from the tag. The server may have any or all of the features of other receiving servers described throughout this description.

According to a further example implementation, there is provided a tag comprising:

a radio frequency (RF) to electrical energy converter configured to generate electrical energy; a radio frequency, RF, communication circuit; and a controller configured to use the electrical energy generated by the mechanical to electrical energy converter to transmit a data signal to the tag reader using the RF communication circuit. Additional electrical energy may be provided by using a mechanical to electrical energy converted and/or a solar energy converter (e.g. photovoltaic).

The protocols and operating procedures described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

Figure 9:
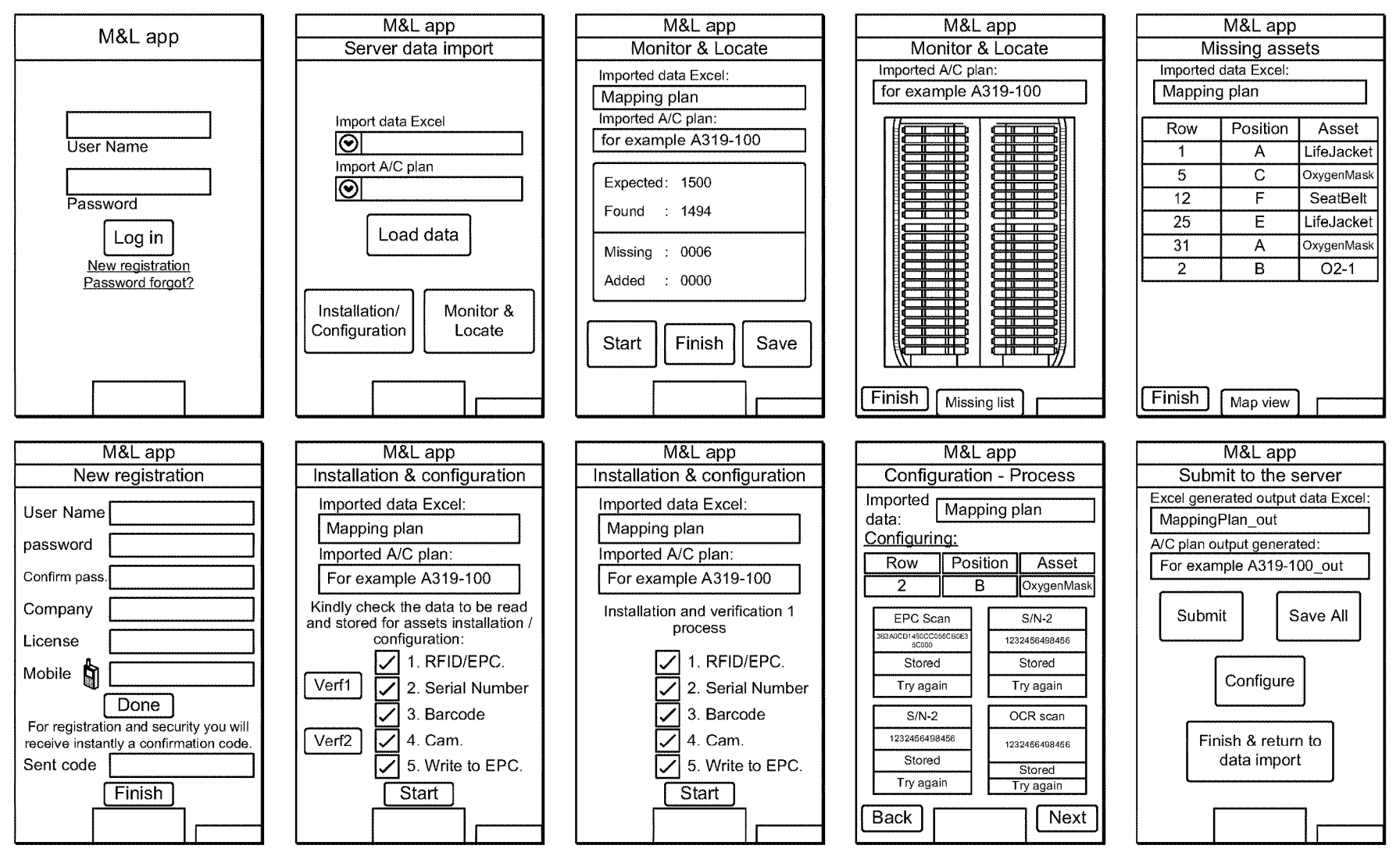

FIG. 9 shows a series of example screen shots from a mobile application used with the software platform or FIG. 7 or 8;

Figure 10:
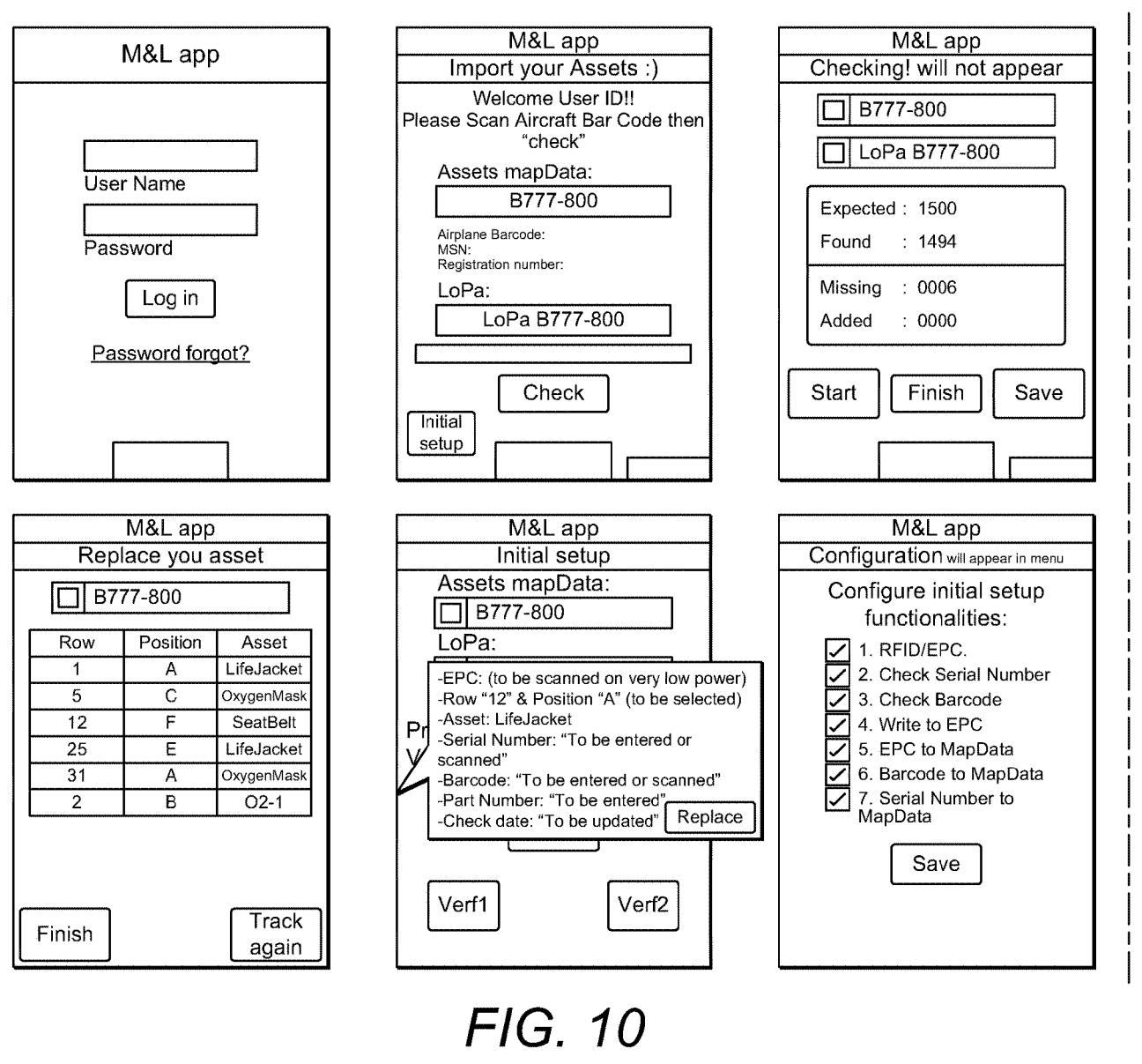

FIG. 10 shows a series of further example screen shots from a mobile application used with the software platform or FIG. 7 or 8;

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
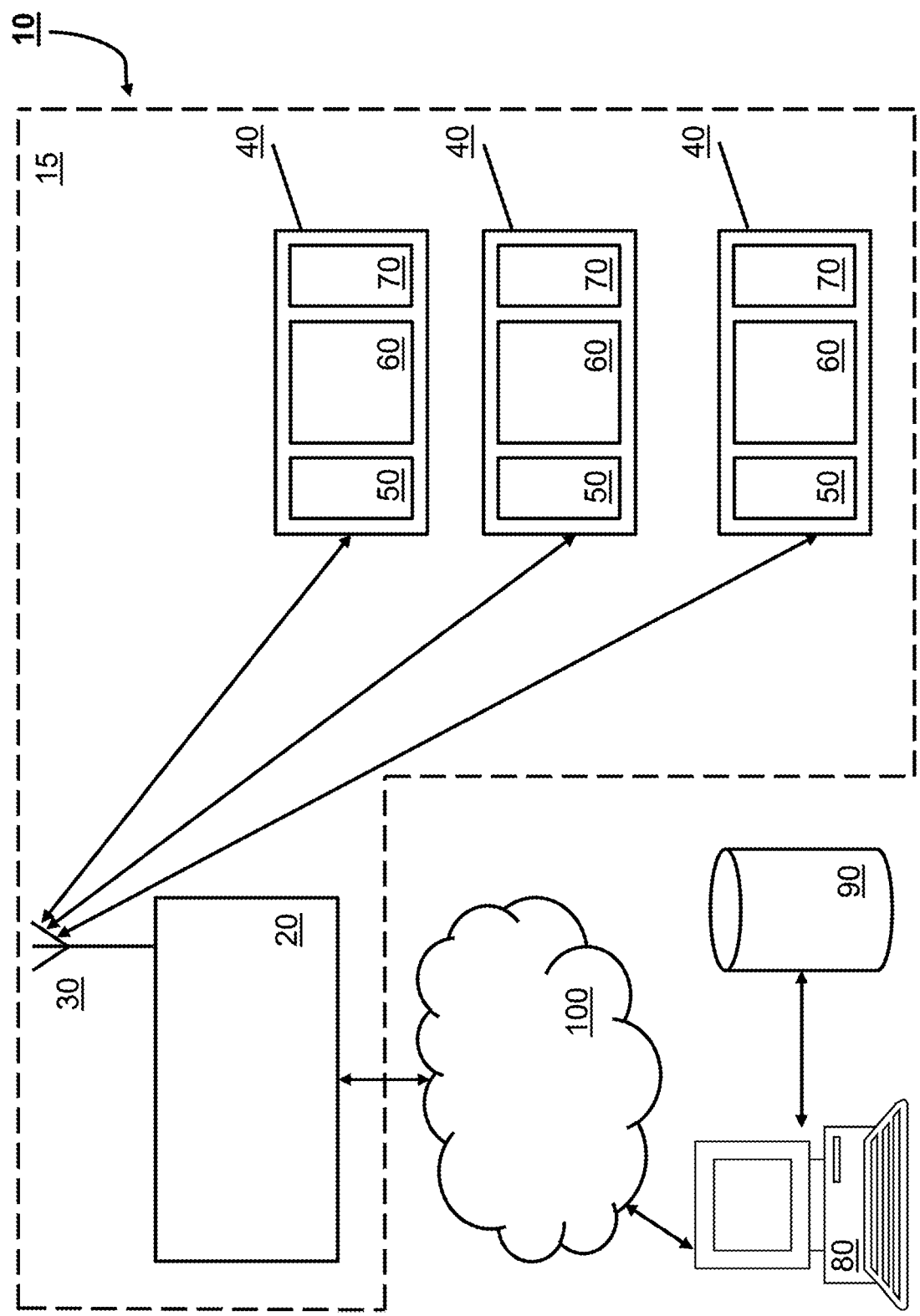
FIG. 1 shows a schematic diagram of a system for tracking items, wherein the system includes tags.

Tags may be RF tags including RFID and WiFi tags. Localisation of the tags may be achieved using a system that incorporates supervised learning. It may be difficult to determine the location of indoor or outdoor tags due to non-line of sight propagation and the presence of indoor obstacles. Tag localisation may be achieved by executing a training period especially tailored for a given space (e.g. coffee shop, library, documents locker, etc.).

The information may be obtained about a tag using a tag reader incorporating an antenna. The tag reader may include a received signal strength indicator (RSSI) to determine properties or attributes of the received signal. Additionally, measurements of received signals are made using the RSSI acquired from different receiving locations by using a single antenna, using different antennas or an array of antennas. A moving antenna may also be used to simulate an array of antennas. The angle of arrival (AoA) of the signal may also be used for localisation and AoA may be determined by measuring the phase difference between the received signals (from the same tag) at different antennas or the same antenna located at different locations.

Location information for each tag, transmitter or radio frequency (RF) communication circuit may be bound to the properties of the received signal at different readers and/or different receiving locations. The location information may be absolute (x, y, z) or relative (e.g. on the shelf, near the desk, close to the door, the fourth shelf to the right, etc.)

The signal properties are mainly received signal strength and AoA measured at different readers but other properties may be used. In a training phase, reference tags may be deployed or located at points of interest with their location information (absolute and relative) stored as labels (or in other formats) and their signal information stored as features or absolute values. The test tags may be distributed throughout the space. The training phase may be carried out using untrained operators. A typical training phase may take up to one or two hours to complete. The training phase may be repeated after changes in the indoor or outdoor environment, such as replacing furniture, for example.

The features and labels (or other data defining the location of tags and signal attributes) may be introduced to a supervised machine learning algorithm in order to build a classification or calibration model when relative position labels are used. A regression model may be used, especially when continuous location variables are used (e.g. x, y and z axes). Different machine learning methods may be used including but not limited to Bayesian classifiers, linear regression, logistic regression, neural networks and support vector machines.

During the testing or calibration phase, tags are deployed and the accuracy of the localisation prediction model may be measured (regression or classification).

Users aren't necessarily looking for the tag itself but they may be searching for an asset, item or target attached to the tag (e.g. object or document). These assets associations (tag/asset) may be stored within a database. For example, each tag may have a unique identifier, which may be transmitted and received with the signal. The tags may be interrogated by a transmitted signal emitted by the tag reader or sent without prompt (e.g. at intervals).

A web service or a desktop application having a search engine may be provided for use by a user to locate tags and/or assets. The user may input keywords to the search engine and receive suggestions for assets along with tag IDs. The user may select a record (asset/tag-id) that matches their criteria. A back-end component may look up the latest signal information for this tag and predict its location using the learnt model. The location is sent as an output to the user. The location may have been predetermined, stored in a database and provided as the output rather than computing the location when requested.

The system may also operate on demand. In this case, the query may prompt the signal or signals from the tags to be received. The tag reader or readers may be activated so that the signal and signal attributes or features are only determined when a request is submitted.

The system may be implemented using a range of different tags. However, the following described tags and tag readers may be used and are provided as an example only.

Figure 6:
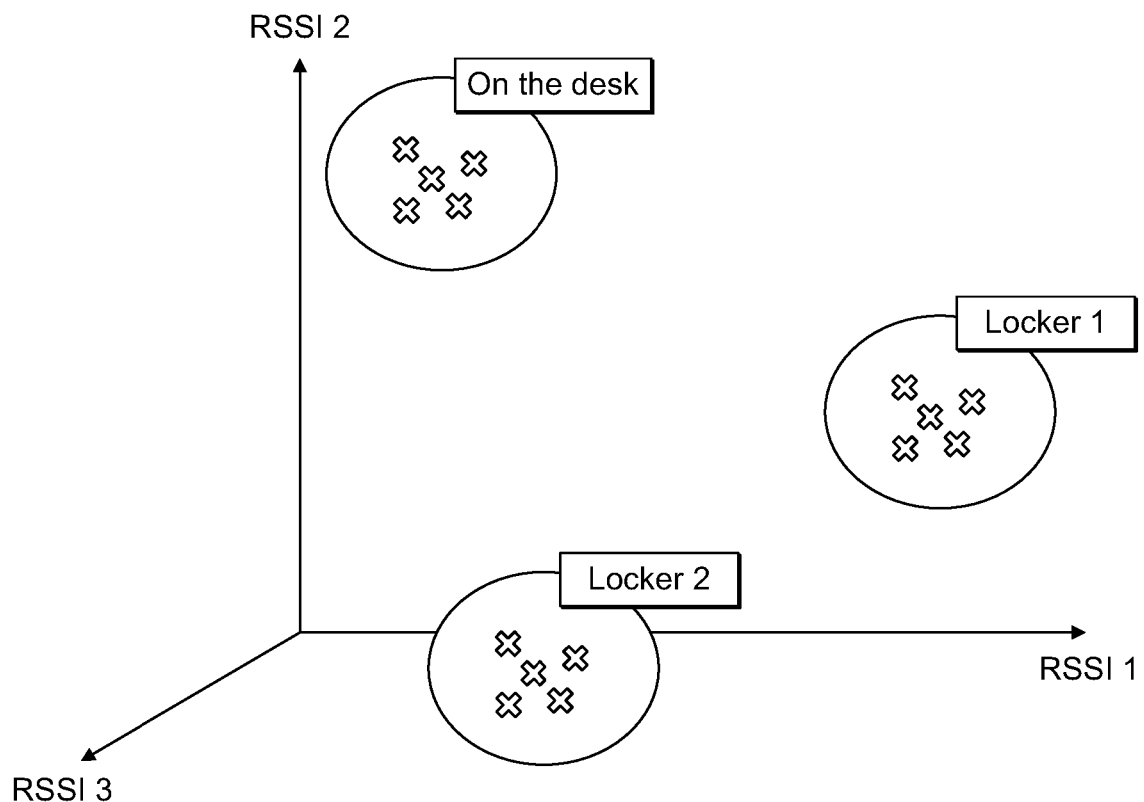
FIG. 6 shows a schematic diagram illustrating the calibration of a tracking system.

FIG. 6 illustrates schematically the RSSI measurements received from groups of tags or test tags located at different locations within a space.

A tracking system uses environmental energy to monitor and analyse the status of items over long distances. The system uses a wireless sensor network that may form a communication system grid.

The system may include several parts including:

1. A node, access point node (APN) or tag reader, which collects data and the information from distributed tags.

2. "Tag" or "intelligent sensor board" (EPT or end point tag) that can monitor the status of the parts in order to report to multiple nodes.

3. A software interface design to link and monitor the collected data from the distributed sensors.

This node design establishes a preferably secure connection with tags to ensure and protect data delivery and to reduce redundancy. Data are encapsulated using a specific and common frame format.

The tag uses a stable and reliable wireless sensor board with an external box or enclosure design that can be used in harsh environments. The tag is self-powered from energy harvested from the operational site and may communicate using a wireless (e.g. Wi-Fi) data connection.

Tags form an energy harvesting wireless sensor network (EHWSN). The tags send data through a defined wireless protocol and receive energy from at least one or two sources: an emitted RF generated signal, and a vibration module. The tag regulates these two sources in order to deliver a stable power source for a microcontroller, wireless transceiver and other sensors (without any externally charged battery supply). The tags may be initiated and partially (or wholly) powered by the access point node(s) (APN(s)), which shall also gather, process and transmit collated data for onward transmission or storage.

FIG. 1 shows a schematic diagram of a tracking system 10. Several items are enclosed in a dashed box 15 and these may be in close proximity to each other (several millimetres up to several tens of metres from each other). For example, all of the items within the dashed box 15 may be within a particular item (e.g. vehicle, aircraft, ship, train, automobile, truck, power module plant, solar module plants, etc.). A tag reader or interrogator 20 has an antenna 30 for wirelessly communicating with individual tags 40. In this figure, three tags 40 are shown but a number from one upwards may be used. Each tag may contain a mechanical to electrical energy convertor 50, an RF communication circuit or circuits (e.g. transmitter, transceiver or separate receiver and transmitter) 60 and a controller 70. The RF communication circuit 60 may provide at least two functions. These may be to communicate with the tag 40 (e.g. using WiFi) and also to provide RF power to the tag 40. At a remote site, there may be a server 80 that has an associated database 90. The server 80 is in communication with the tag reader 20 over a wide area network 100 that may be the internet, a cellular network, a satellite system, or other wireless (or in part wired) communications network. The server 80 (which may be physical or cloud-based) may monitor a plurality of different tag readers 20 although only one is shown in this figure for simplicity. More than one tag reader 20 may be used in each locality or vehicle, for example.

Therefore, the tags 40 only need to communicate over relatively short distances but individual items that may be attached to each tag 40 can effectively be tracked at any distance and monitored centrally by the server 80. For example, the server 80 may send a signal over the network 100 to one or more tag readers 20, which sends a signal through its antenna 30 to be received by each tag 40 and in response, each tag sends a signal back to the tag reader 20. These data may be communicated over the network 100 back to the server 80 and optionally recorded in the database 90. Therefore, tags and consequently items attached to those tags that do not respond, may be determined to be missing. Furthermore, a tag 40 that should be located within a particular system 15 (e.g. an original part of an aircraft) may be found elsewhere by a different tag reader 20 in another system 15 when it receives a data signal from this particular misplaced tag 40. The different tag reader 20 may then report the new location through the tag reader 20 to the server 80, which may update the database 90 in response. In one example, a tag 40 may be attached to an aircraft part (e.g. an engine). Should the engine be removed and moved to a new aircraft, then the tag reader 20 on the new aircraft may report the presence of such a part, which may automatically be logged and audited without need for additional paperwork.

The system 10 may operate without the tag reader 20 sending out any interrogating signal. Instead, each tag 40 may transmit (without prompt) a regular data signal, which is received by the tag reader 20. The server 80 may request from any one or more tag readers 20 the last set of received data. The system 10 may also operate in either or both modes (regular data transmissions and/or interrogating signals and responses).

Figure 2:
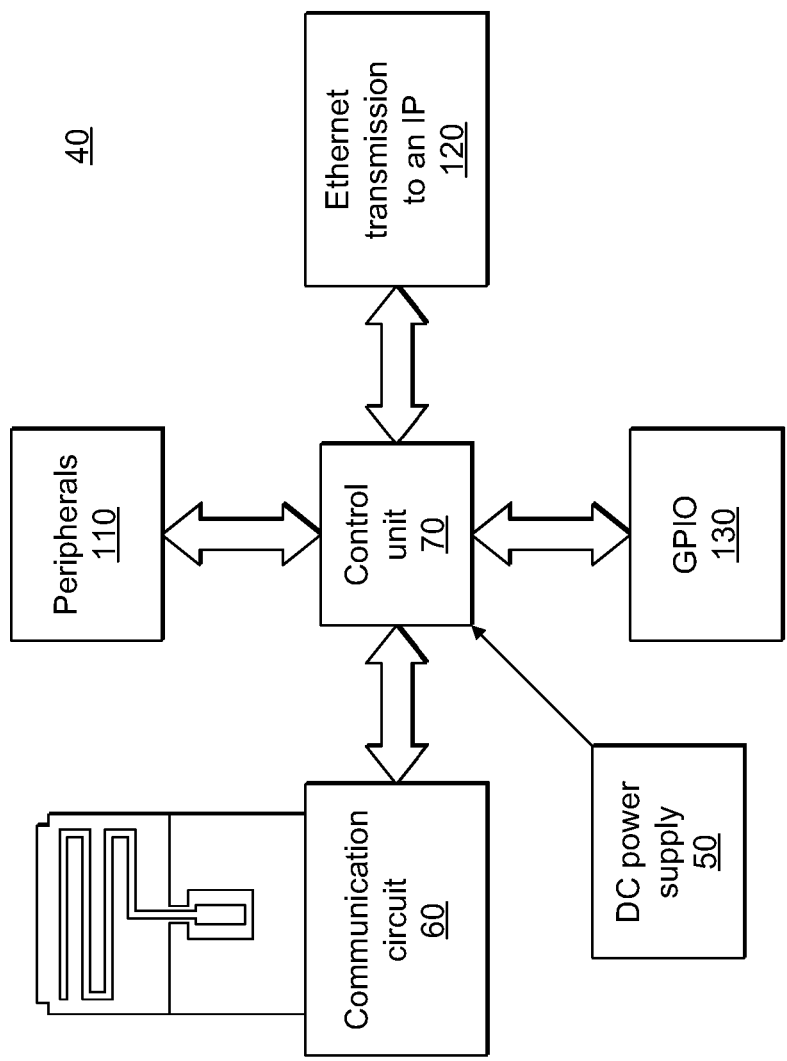
FIG. 2 shows a schematic diagram of a tag within the system of FIG. 1.

FIG. 2 shows a schematic diagram of an individual tag 40 in further detail. The control unit 70 is shown connected to the RF transceiver (or transmitter) 60 and mechanical to electrical converter 50, which provides DC or AC power (e.g. using a DC/DC or AC/DC converter) to the control unit 70. Additional peripherals or sensors 110 may be attached to the control unit 70. An Ethernet transmission unit 120 may provide internet protocol communications using the RF transceiver (or transmitter) 60. A general purpose input/output unit 130 may also be connected to the control unit 70 for other communications (e.g. tests, setup, firmware updates, etc.).

The mechanical to electrical converter 50 may be a piezo vibration sensor that may momentarily provide electrical power when the tag 40 moves or vibrates, which may be due to the motion or vibration within a vehicle, such as aircraft. Such energy harvesting provides a tag 40 with sufficient power such that it does not need to rely on a nearby interrogating signal for power and its range may be extended. This can be important in large vehicles, such as larger aircraft, ships and trains (which are capable for housing the separate tag reader 20), for example. However, each tag 40 may additionally include an electrical circuit to take energy from the interrogating signal if this is strong enough (i.e. if the tag reader 20 is close to the tag 40). Therefore, the tags 40 may have more than one source of power.

Figure 3:
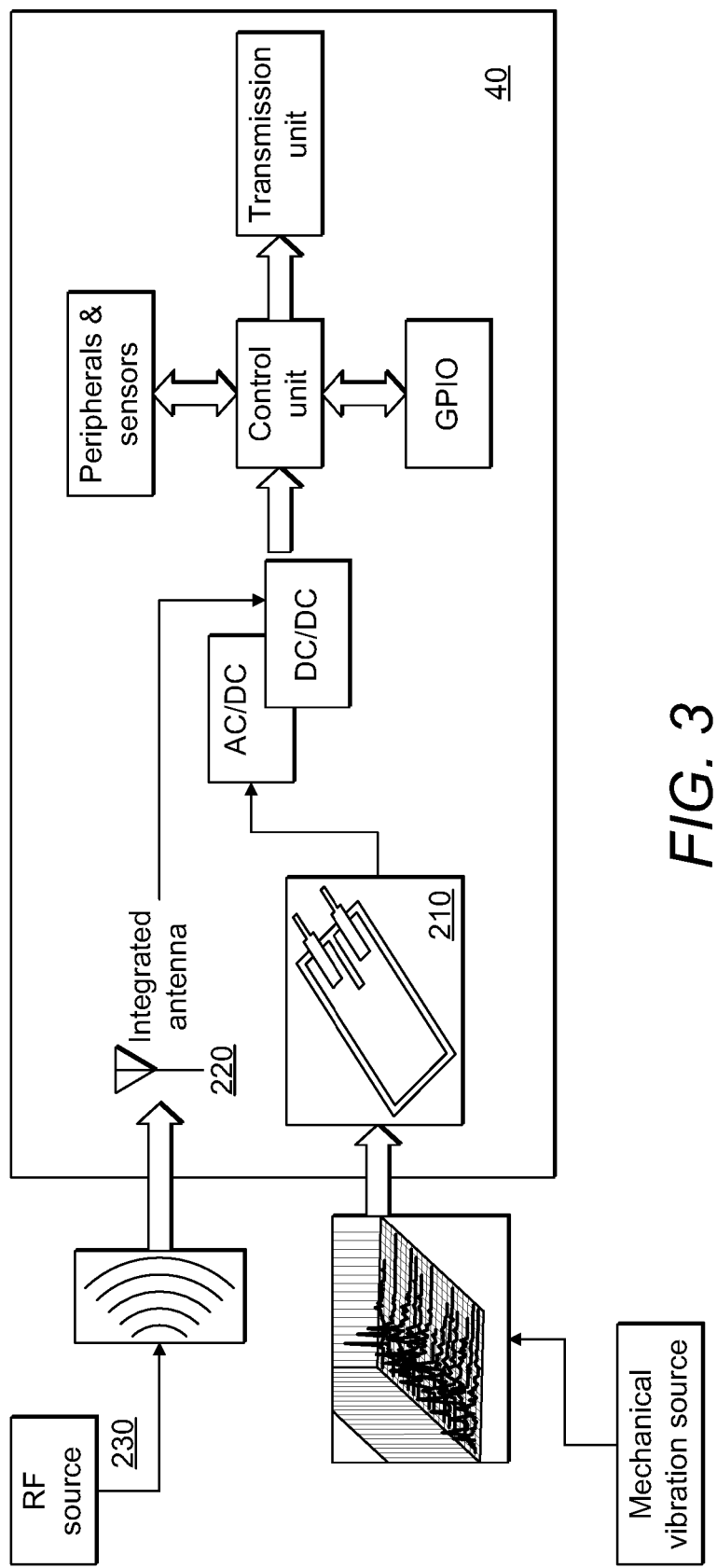
FIG. 3 shows a further schematic diagram of the tag of FIG. 2 including different sources of electrical energy for the tag.

FIG. 3 shows a tag 40 and further illustrates schematically two ways in which energy may be generated and used to power the control unit 70 and electrical components within the tag 40. In particular, the piezo vibration sensor 210 is shown connected to an AC to DC convertor. An RF source 230 (e.g. from the tag reader 20) produces RF energy received by an integrated antenna 220, which is connected to a DC to DC convertor in order to condition the signal for use as power within the tag 40. Additionally, energy storage may be included within the tag for storing harvested energy either from a mechanical to electrical converter and/or from the RF source 230.

Figure 4:
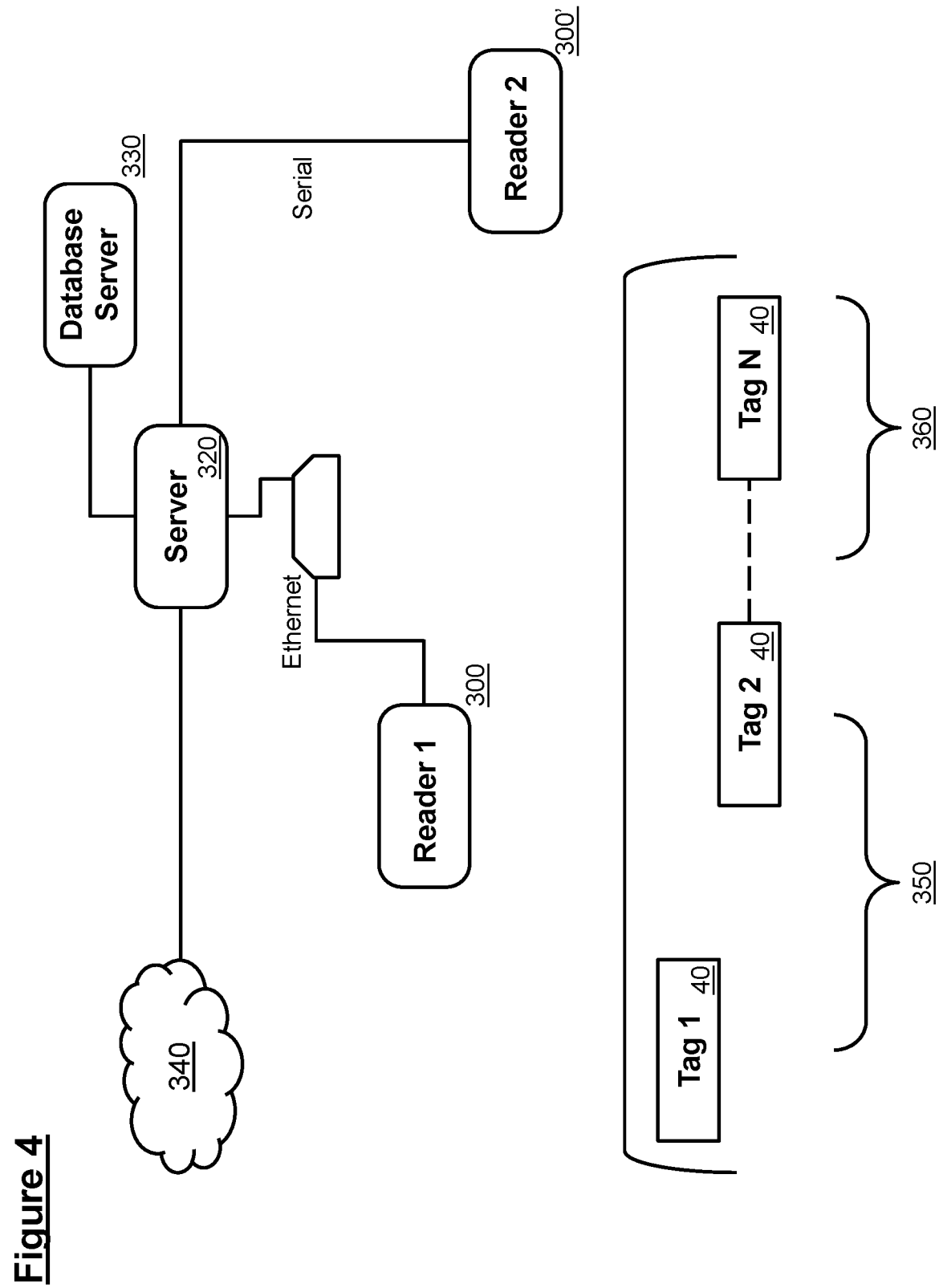
FIG. 4 shows a schematic diagram of a system for monitoring the tags of FIGS. 2 and 3.

FIG. 4 shows a further schematic diagram including more details of the tag reader, tags 40 and particular processing of signals to and from the tags by the tag reader 20. There may be more than one interrogator 300 within a local environment. Each interrogator may each have an antenna 30 and associated RF interface. In this example implementation, a first interrogator or reader 300 is in communication with a local server 320 through an Ethernet connection using Ethernet switch 310. A second interrogator or reader 300' is in serial communication with the server 320. There may be more than one Ethernet and/or serially connected interrogators 300, 300' within the local environment 15. The server is in communication with a local database 330, which may be a MySQL server, for example. Tags 40 may be grouped into different sets 350, 360 and read by either or both interrogators 300, 300'. In this way, some processing may be carried out by the server 320 locally before reporting results to a data processing service 340, which may be a dedicated physical server 80 or a cloud-based web service or virtualised server. There may be one or more tag readers within this local system.

As described previously, each tag 40 may be powered using one or two sources of energy:

Where RF energy is used then it may be harvested and switchable between the following example frequency bands:
  a. GSM-850 uplink.
  b. Europe RFID & GSM-850 downlink.
  c. ISM USA & GSM-900 uplink.
  d. GSM-1800 uplink.
  e. GSM-1900 uplink.
  f. Wi-Fi 2.4 GHz.

Any one or more of these bands or protocols may also be used to send data back to the central server 80. More generally, two frequency bands may be used, e.g.: 820 MHz to 960 MHz and 2.40 GHz to 2.45 GHz.

The mechanical energy may be harvested from any one or more of:
  a. Low frequency environment:
  i. X, Y and Z acceleration.
  ii. In general, the vibration environment may have an acceleration between ±0.05 g in the operating mode but in the sleep and/or a deep sleep mode it may be between ±0.5 g applied for between 0 and 900 seconds.
  b. The operating mode may be active for 45 minutes, for example. The sleep mode may vary between 240 and 720 minutes, for example.

3. On the tag 40, multiple circuits may be implemented to deliver a stable and reliable voltage to a low power control unit (controller 70), sensors 110 and transmitter or transceiver 60.

4. An Omni-directional antenna (preferably with a near to isotropic energy pattern) may be provided to each tag 40.

5. A capacitor or battery may be used to store the generated energy (from either or both sources) and provide regulated power to the tag 40.

6. Preferably, SMD (surface mounted device) using multiple layers may be used to reduce tag size and footprint.

7. Mechanical strengthening may be used to enable the tag 40 to withstand harsh environments in some embodiments. Lighter and smaller or less rugged designs may be used for more benign environments.

8. The tag 40 may include any or all of the following sensors: humidity, temperature, light, an external GPIO (general purpose input output) component.

The access point design (RFID tag reader 20) may collect all frames of data from the EHWSN (network) or individual tags 40. For example, the RFID tag reader 20 may manage up to 8000 simultaneous connections with high reliability and avoiding frame redundancy and collision. The RFID tag reader 20 may include a GSM module to provide wide area network connectivity. Software on the RFID tag reader 20 and/or tag 40 may be written using C, C++ or another suitable language.

The collected data (e.g. from one or more tags 40) may be encapsulated in a suitable format (e.g. CSV or Jason format). Other formats may be used, such as database formats or mark-up formats. The data may be sent to the server 80. The RFID tag reader 20 may include a transceiver that will respect the same wireless protocol used within the tags 40. The RFID tag reader 20 may be powered with a DC voltage between 8 and 28 volts in this example, although other power supply parameters may be used. The RFID tag reader 20 may include software or firmware able to locate or communicate with individual tags 40 over defined range (e.g. up to 5 m, 10 m, 20 m, 100 m or further).

The energy source of the tag 40 may use a mechanical to electrical energy converter, such as a piezo transducer. However, this may be supplemented by power derived from the RF transmitter of the RFID tag reader 20, preferably received using an integrated omnidirectional antenna on the tag 40.

Tags 40 may operate using firmware using a C platform to control and monitor inputs and to execute an algorithm for tag wireless localisation. The controller 70 may also control and monitor request received from the RFID tag reader 20 and receive data frames in a suitable format over a serial and/or Ethernet communication. The RFID tag reader 20 may also include platform including a physical local server to manage data received from tags 40. This local server may include a database to store and provide data on request.

Particular functions of the software or firmware platform within the tag reader 20 to control and monitor tags may include any one or more of:

> DataCollectorManager;
> QueueTemporaryStorage;
> DataTransmissionManager;
> LocalizationManager;
> TimeSyncManager; and
> ServerComTask.

The software or firmware within each tag 40 may include any one or more of:

> DataCollectorManager;
> SensorManager;
> PowerManagementManager; and
> TransmissionManager.

Application interface(s) may be included to manage and process data between different elements or components in the system. These application interfaces may provide a more stable and reliable tracking application for real-time processing, with a large data database design, which is preferably extensible.

In one example implementation a localisation methodology or procedure may be used to determine locations of a tag or tags. The localisation methodology in this example is composed of two phases. Phase 1 may be described as narrowing the search by using distance activation.

By using different power levels, sets or sub-groups of tags may be identified. This may be achieved by determining a response to a probation or interrogating signal issued by a tag reader. These sets may be nested, for example. Sets may be isolated or determined by differentiation. For example, set A may be a global set of tags (recording maximum signal level), set B may be a mid-range set (mid-range signal level), and set C may be the close set (e.g. minimum signal level). In this case, we can group tags into three groups or sub-groups:

close tags: is the set C
mid range tags: is the difference set B-C
far tags: is the difference set A-B When multiple antennas are used, further divisions (sets) may be formed. Take for example the case of two antennas, where each antenna has a 2-level distance activation, In this case we can divide the tags further into 5 sets.

Take another example where we have three antennas and 2-level distance activation. We can divide the space into 10 sets, accordingly.

It is clear that by increasing the number of antennas and increasing the number of levels of distance activation, we have a more finely tuned distribution of tags into sets. For instance, in a straight line topology (like on an aircraft or in a train) 10 power levels may be achieved (e.g. 3, 6, 9, . . . 30 dbm or dB) and we take 10 RSSI measurements for each power level. This is repeated at each new position in our trajectory.

In case of a moving antenna equipped with relative coordinates (this may be one coordinate, such as distance from starting point, two coordinate such as a position in a map, or three coordinates such as position in a 3D map), moving antennas may represent multiple antennas in different locations, which is similar to the situation involving multiple receiving antennas. Antenna measurements may be acquired at discrete locations (for example, at discrete time periods given that the antenna may be moving at a constant speed). The antenna/reader may be equipped with a gyroscope and/or accelerometer to measure a distance from an origin. Details about this equipment are provided below.

In case of a moving antenna in a straight line topology (like in an aircraft), each set may be divided into two subsets (left and right) using angle of arrival (AoA) measurements. A rotating directional antenna may be used to measure the AoA.

Phase 2: Match tags with patterns learned during the calibration phase. In case of multiple antennas, machine learning classification may be used to match tags with locations.

The input of the classifier may include:
The measurements of received RSSI/Phase for a tag, as recorded by different antennas. These measurement may form a vector of n dimensions where n is the number of measurements.
The previously calibrated model for tags with labelled, predetermined, or known locations.

The procedure has been tested with classifiers, such as support vector machines, which shows very good accuracy. In the case of moving antenna (s), this may be considered as multiple antennas by using measurements at fixed discrete locations. In another example, measurement patterns may be matched with calibration patterns using a special or particular distance metric. For example, Dynamic Time Warping (DTW) may be used as a distance measure for phase patterns.

Localisation of a mobile reader from an unknown specified (starting) point may be followed by tracking path movement. This provides an instant (real time) localisation of the tags. The accurate measurement of orientation plays a critical role in the localisation of a moving point. Different technologies have been adopted enabling the measurement of orientation.

Inertial based sensory systems have an advantage of being completely self-contained, such that a measurement entity may be constrained neither in motion nor to any specific environment or location. This design consists of gyroscopes and accelerometers enabling the tracking of rotational and translational movements. In order to measure in three dimensions, tri-axis sensors consisting of three (mutually) orthogonal sensitive axes may be required. A Magnetic, Angular Rate, and Gravity sensor may be used in a hybrid design, which incorporates a tri-axis magnetometer. Attitude relative to the direction of gravity is measurable with this configuration, which is sufficient in the present case.

This system, may be known as AHRS (Attitude and Heading Reference Systems) is able to provide a complete measurement of orientation relative to the direction of gravity and the earth's magnetic field. A gyroscope measures angular velocity which, if initial conditions are known, may be integrated over time to compute the sensor's orientation. MEMS (Micro Electrical Mechanical System) devices may be used (e.g. as accelerometers and gyroscopes). The integration of gyroscope measurement errors may lead to an accumulating errors in the calculated orientation. Therefore, gyroscopes alone may require additional sensor to provide an absolute measurement of orientation.

An accelerometer and magnetometer may measure the earth's gravitational and magnetic fields, respectively and so provide an absolute reference of orientation. The task of an orientation filter is to compute a single estimate of orientation through the use of gyroscope, accelerometer and magnetometer measurements. A Kalman filter has become the accepted basis for the majority of orientation filter and commercial inertial orientation sensors; xsens (Xsens Technologies®), micro-strain (MicroStrain Inc. 3DM-GX3), VectorNav (VN-100 from VectorNav Technologies), Intersense (InertiaCube2+ from InterSense), PNI (Spacepoint Fusion from PNI sensor corporation) and Crossbow (AHRS400 from Crossbow Technology) all produce systems founded on its use.

In order to get a more accurate positioning of the mobile scanner, an analytically derived and optimized gradient descent algorithm has been applied, enabling improved performance at low sampling rates. On-line magnetic distortion compensation algorithm; and gyroscope bias drift compensation may further improve accuracy.

Data acquisition is performed throughout according to the following example values:
Triple-axis gyroscope (e.g. ±2000°/s, 400 Hz sample rate)
Triple-axis accelerometer (e.g. ±16 g, 400 Hz sample rate)
Triple-axis magnetometer (e.g. ±1300 µT)

Power selection priority may be used. This may help meet particular regulations (e.g. in aviation). The system may also be used with documents (e.g. tracking, sorting and filing). Each tag and/or reader may have an expected life of up to 15 or 20 years. Each tag may be flexible and/or configured to conform to the shape of items that it may be attached to.

In one example, the operating power range between the tag (end point tag or EPT) and the reader (APN) may require a range or 10-12 m and may take into account various type of obstacle including: plastics, metal and glass. The size of the EPT may comply with the ISO/IEC 7810 which is ID-1: 85.60×53.98 mm. the tag enclosure may be as thin as possible and may include an integrated solar thin film.

The tag may be powered from multiple sources of energy (e.g. any one, two or three of the following):
  i. RF energy may be harvested and switchable between as available from the following list of example frequencies bands (or more generally, two frequency bands may be used, e.g.: 820 MHz to 960 MHz and 2.40 GHz to 2.45 GHz):
    a. GSM-850 uplink.
    b. Europe RFID & GSM-850 downlink.
    c. ISM USA & GSM-900 uplink.
    d. GSM-1800 uplink.
    e. GSM-1900 uplink.
    f. Wi-Fi 2.4 GHz.
  ii. A harvester on the tag may be connected to an integrated Omni directional antenna on the tag's PCB and it may optionally harvest 1.2 Volts to power a booster or voltage converter to deliver 3.3 volts to charge a SMD super capacitor (Vcap) and then to supply control, sensor and transmission units.
    a. An example harvester may be a chipset that provides any one or more of:
      i. High conversion efficiency up to 75%.
      ii. Wide RF operating range −17 dbm to +20 dbm.
      iii. Wide frequency range: 100 MHz to 6 GHz.
      iv. Packaging SC-70.
    b. The booster may be a chipset that provides any one or more of:
      i. High efficiency up to 95%.
      ii. Packaging: SOT23-6.
      iii. Capable of 5.5V @ 50 mA output.
    c. The RF to DC circuit may transform and harvest the above-mentioned frequencies or frequency bands.
  iii. Solar energy harvesting preferably integrated on the outside package of the EPT.
  iv. The implemented regulator on the EPT's PCB may support multiple source of energy. This design defines the presence of the RF energy to operate otherwise the regulator restricts or shuts off power as per the scheme described with reference to FIG. 5.
    A DC regulator for the Solar and Vibration Piezo (with a double AC input) may use a QFN 6×6×0.85 mm dimension package. This may provide an output current up to 100 mA over 3.3 Volts. Alternatively, another zero power wireless sensor may be used (in this case, a different microcontroller may be required).

Figure 5:
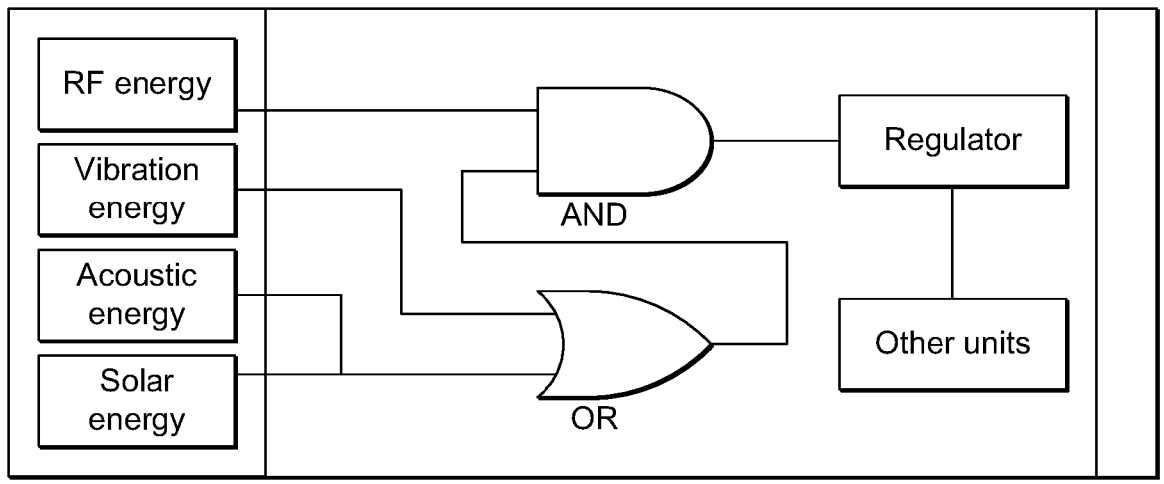
FIG. 5 shows a schematic diagram of power sources for an example tag as well as selection and priority logic for each source of power.

FIG. 5 illustrates schematically the different power sources for a tag 40.

Mechanical Harvested Energy:
  a. Low frequency environment (vibration energy): In general, the vibration environment will have an acceleration between ±0.05 g in the operating mode but in the sleep and deep sleep mode it will be between ±0.5 g the time to consider is between 0 to 1350 seconds.
  b. Operation time of may be limited to 45 min as maximum, the sleep mode can vary between 240 and 720 minutes.
  c. Acoustic energy harvesting (this may depend on environment, including airplane energy distribution).

2. Multiple circuits within the EPT may be implemented to deliver a stable and suitable voltage to a low power control unit, sensors and transceiver.

3. An Omni antenna design on EPT's PCB reliably receives RF energy from all the directions in order to be operational all the time and at all the locations.
  a. The antenna may receive transmitted energy with multiple polarization: vertical, horizontal and circular:
    i. For RF energy, an orthogonal antenna with A/4 wavelength of the received signal with antenna feed and an example impedance 75Ω.
    ii. Matching Network circuit (between the transmitter and the receiver) avoids or reduces electromagnetic interference (EMI).
    iii. Antenna or multiple antenna band width may cover from 860 MHz till 960 MHz with the 2.39 GHz till the 2.45 GHz (with a minimum of reflection up to 1% as an optional maximum).
    iv. Return loss antenna may not exceed 5% to have an improved pattern radiation.
    v. The receiver may operate at least 3.3 volts with 32 mA load.
  b. A smart antenna with multi path reception (isotropic pattern reception) is provided on a multilayer path PCB design. Alternatively, a chip smart Antenna may be used to reduce required space on the PCB.
  c. Antenna design may comply with HID regulations.

4. Use of a specific supercapacitor (e.g. Thin line 2.0 mm 5V 85 mF 85 mΩ).

5. SMD (surface mounted device) with multiple layer provide a small tag size (e.g. maximum size being a credit card size) and foot print. Flexible shapes may be used with multiple mini boards interconnected by robust flat cables. The EPT's PCB layout may divide into multiple modules that may be separated.
6. A cover may be provided to the PCB tag for normal environments and/or for harsh environments as required.
7. The EPT may include the following sensors: temperature, light, external GPIO (general purpose input output), humidity, etc.
8. Security and encryption within communications between the EPT(s) and the APN(s).
9. A simulation for the functionality for mixed signal processing testing on board may be carried out.
10. EPT's and APT's firmware may use C code or other suitable programming language. This code is able to at least carry out any one or more of:
   a. Read multiple sensors by interrupt programming: light, temperature, humidity.
   b. An GPIO input is ready to read data and Voltage level up to 3.3 Volts to the control unit.
   c. Coding and firmware may comply with: aviation standards as, RTCA DO-178C, DO-178B, ARP4754 and DO-254.
11. The microcontroller may be a 16 bit (QFN package) with nanoWatt having any one or more of the following consumption proprieties:
   a. 20 nA Deep Sleep mode.
   b. 25 nA Sleep mode.
   c. 500 nA on real-time clock but in the sleep mode status.
   d. 195 uA at 1 MHz run operating mode.
   e. 5 uS wake-up from sleep mode.
   f. −40 C to 125 C.
12. The wireless communication may be based on P2P wireless protocol with an integrated antenna (Tx operation 32 mA and Rx operation 21 mA).
13. The mechanical design of the enclosure may contain a thin solar energy film (e.g. PV) and may have the size: 46×30×0.2 and weigh 0.2 g, for example.

APN:

An example access point node (APN) may provide:
1. The access point may collect all the frames from the EHWSN tags or EPTs. It may be able to manage 5000 simultaneous connections with high reliability to avoid frame redundancy and collision.
2. The collected data may be encapsulated in csv or Jason format (this can be changed) and sent to the Server to be interfaced with specific applications in order to monitor the data for a user.
3. The access point transceiver may respect the same wireless protocol of EPTs.
4. The APN may be powered with a DC voltage between 25 to 32 volts (typically it will be 28 VDC).
5. The firmware of the APN may localise the EPTs with an acceptable marge of error (5 cm-25 cm) that will be defined depending on operational environment.
6. The APN may use an integrated ARINC reader protocol to communicate the Data through an external server IP and port. The data may also be communicated by GPRS/GSM communication upon request.
7. The APN and the EPTs may include both direction communications to read and update the data on the distributed EPTs on demand through the wireless communication protocol.
8. Security and encryption at the communication APN(s) and the Server IP.
9. The Control unit of the APN is based also on a 16 bit IC with another integrated module to report using USB, the collected frames from the EPTs.
10. The Wireless access point used may be a Daughter board access point used with the wireless communication protocol (part of the APN).

RF Transmitter:
1. The EPT energy source may be powered mainly from an RF transmitter (but also including mechanical energy supplementation, where appropriate) that can provide a high range of coverage with integrated Omni directional antenna. This transmitter may be integrated inside the APN.
2. RFI (Radio frequency interference) conditions (for the APN and EPT) in board conducted between 30 KHz and 2.4 GHZ (mixed signal issues) and in air should not interfere with the following signals:
   a. Utilization in the frequency band 117.975-137.000 MHz.
   b. Utilization in the frequency band 108-117.975 MHz
   c. Utilization in the frequency band 960-1 215 MHz for DME
   d. Utilization in the frequency band 5 030.4-5 150.0 MHz.

The antenna of the RF transmitter is preferably an isotropic Omni directional with 360 energy pattern distribution.

A software platform, including applications for mobile devices (e.g. laptops and tablets) is provided to calibrate and use the tags to monitor items, their presence and locations. Components of the software platform include a server. Preferably, the server is scalable and so may be implemented using cloud technologies. In one example implementation, the server is an elastic beanstalk application. Elastic beanstalk provides a specific container that supports a Spring boot application. A single Ec2 instance (Amazon web services) is used in this example, with the ability to be automatically scaled to multi instances using a load balancer. Other cloud providers (or physical servers) may be used. The storage is preferably a relational database.

The Spring boot application represents all of the server functionalities. Spring boot offers a simple and flexible way to handle security configuration, MVC controllers and storage services. A highly secured channel is created for the communication between an app (e.g. a mobile app) and the server using a refreshable unified resources identifier within a two minutes timeslot, for example.

Figure 7:
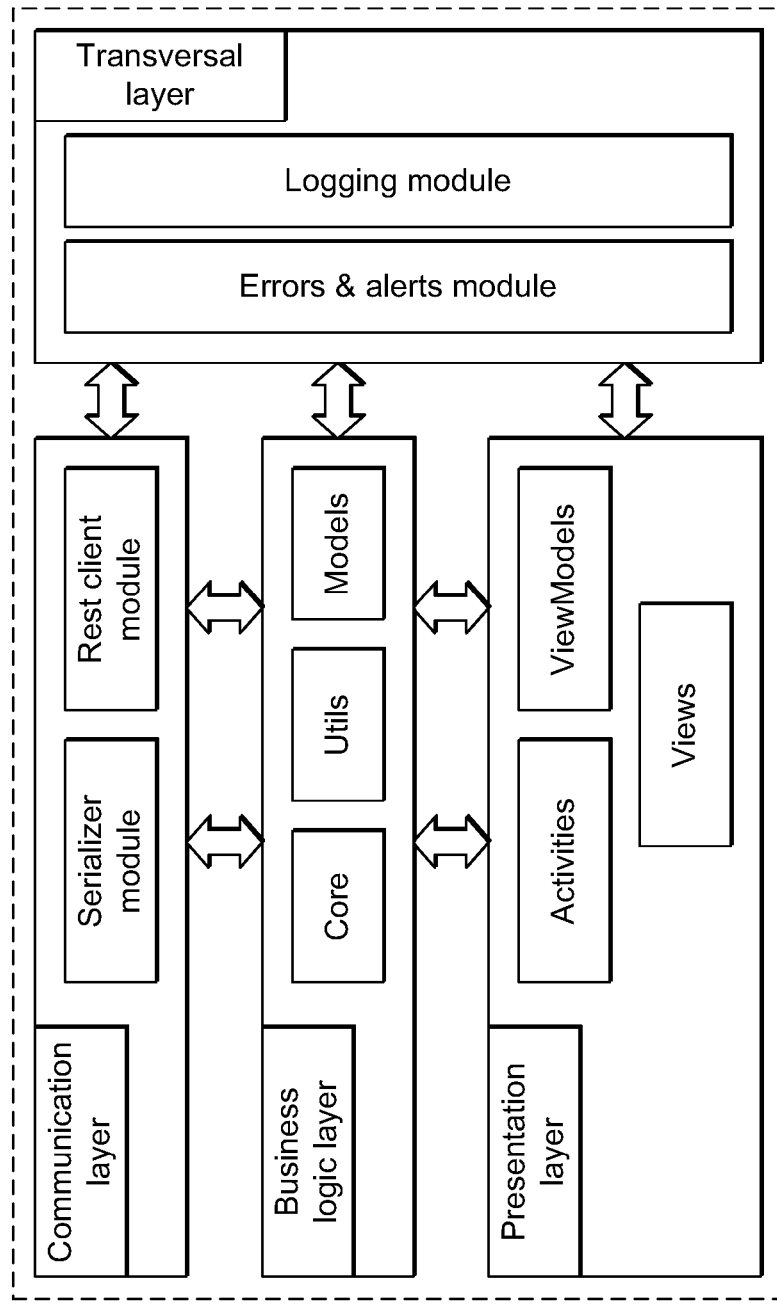
FIG. 7 shows a schematic diagram of an example software platform used to manage and use the system of FIG. 1.

The server manages the following functionalities and uses real time processing:
  Add vehicle (e.g. aircraft) and its layout of passenger accommodation (LOPA) with the ability to create a personalized LOPA by the user for any aircraft type then send it a client application (e.g. mobile app). The mobile app is referred to as Monitor and Locate (M&L).
  Add (e.g. four) assets type to an aircraft or other item and then attach them to each seat with a user friendly interface.
  Personalised interval management rules for required procedures and standards.
  A user can access information and functionality for one or more vehicles (e.g. aircraft).
  Each aircraft has a set of assets.
  Each aircraft undergoes one or many audits. Audits have several types and forms of report or results A further component of the software platform is the mobile application client (M&L). The mobile application is divided into three principal layers (as shown in FIG. 7). The application modules and components are structured into multiple layers.

This structure allows decoupling of codes and components according to their business purpose and type. Each layer has its own goal and scope.

The communication layer encapsulates all operations and types necessary to establish a request or receive a response from the (remote) server. The server exposes a rest web service that is a provider of data (that replaces a data layer that is otherwise missing from FIG. 7). In order to consume the rest web service, the communication layer integrates two modules:

1. Rest client: which is the implementation of a rest service client (implementing the communication protocol (e.g. http verbs, base url and uri formats)
2. The serialiser module: which is in charge of transforming (converting) objects (Data Transfer Objects) into a serialised version that can be integrated into requests/responses (e.g. as body or headers).

Figure 8:
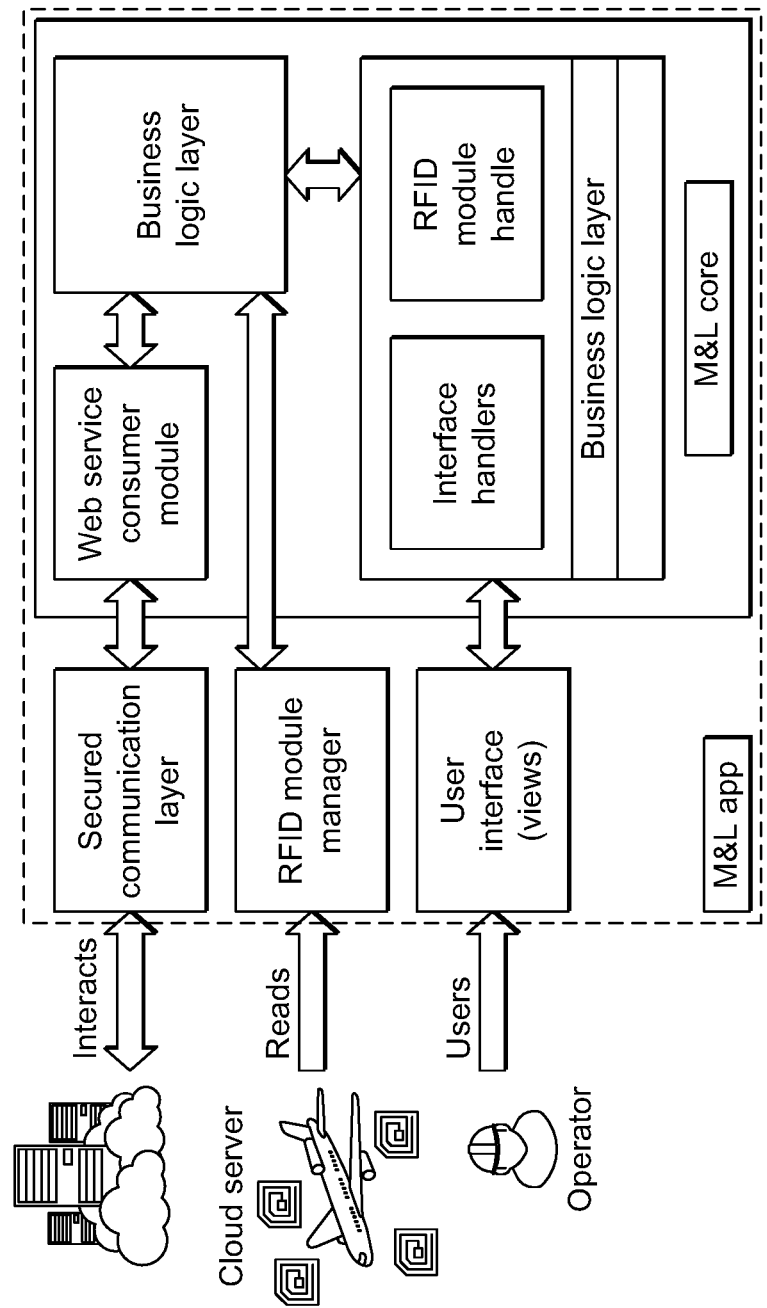
FIG. 8 shows a schematic diagram of a further example software platform used to manage and use the system of FIG. 1.
Figure 11:
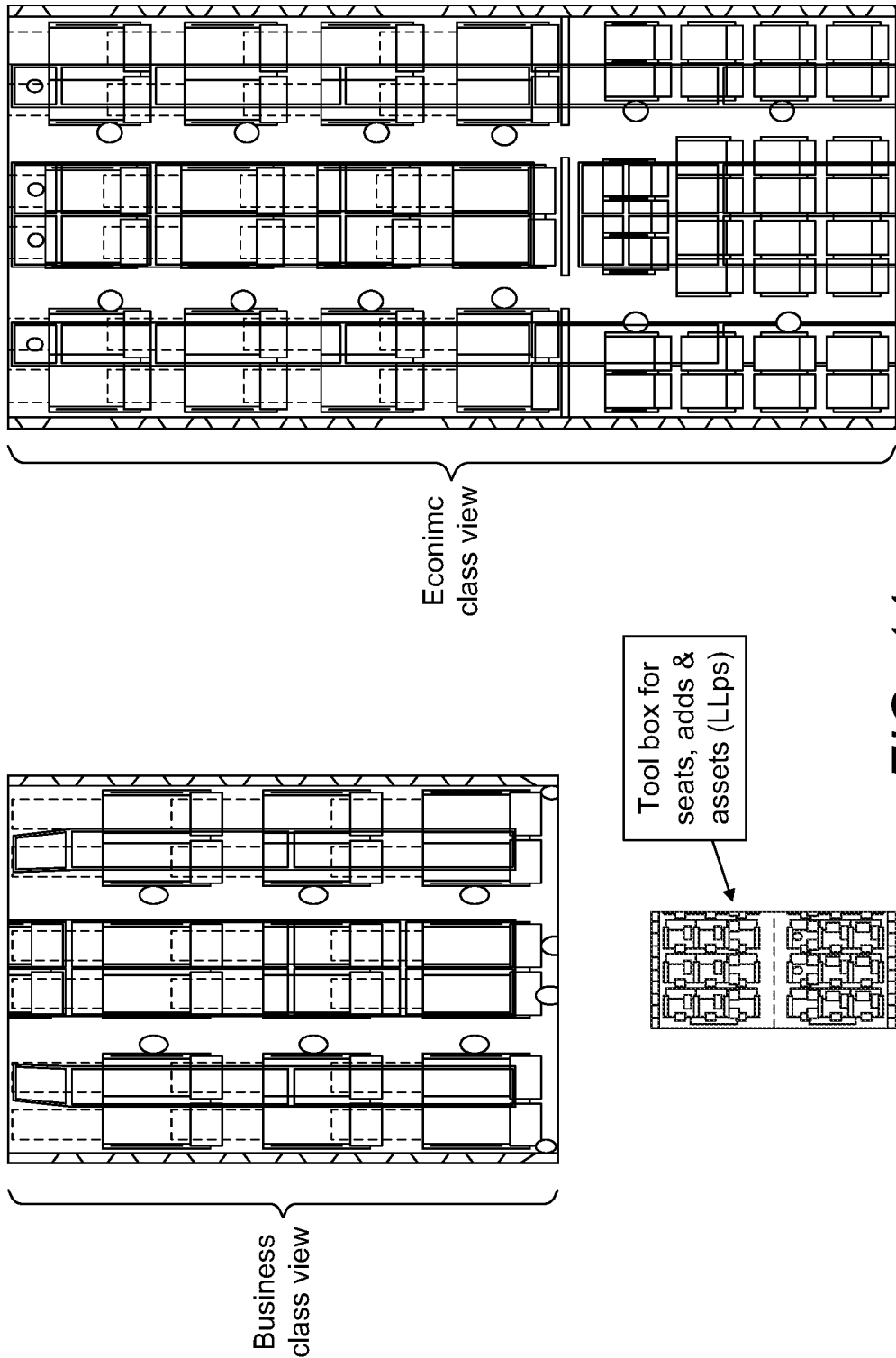
FIG. 11 shows an aircraft layout, as displayed within the mobile application.

FIG. 8 shows an alternative example software platform.

A business logic layer (BLL) contains intelligence implemented by the application. The BLL includes primary module including:

1. Models: the models represents an interface (programmatic not UI) and all required classes. The model package encapsulates all classes that will structure the business required members (data and actions).
2. Utils: represents a set of operations that are needed to facilitate business operations like: persistence of data in files, and similar specific functions.
3. Core: that is a structural entity that organises the solution.

The presentation layer encapsulates all necessary components to implement a user experience (including UI and behavior handler). This layer is distributed across three Concepts:

1. Activities: represent a custom activity derived from a base android activity (or another OS). It offers additional standard behaviors (e.g. logout, settings, binding protocol, navigation, interactivities data transmission, etc.) and encapsulates custom data.
2. ViewModel: represents a custom implementation of view model component of the MVVM design pattern. It is in charge of handling the interaction and data binding.
3. View: represents the xml documents that produce the user interface.

This layer contains all the transversal operations and services that are accessible through other application modules and ensure a robustness of the application.

The MVVM pattern implements a robust application and allows unit testing.

Application data user interface details:

FIGS. 9 and 10 include example screenshots taken from the mobile application user interface. The following describes the actions and data displayed within these screens (i.e. within a display of the mobile device). The mobile device may include an antenna or reader for detecting the tags or may be in communication with such a tag reader.

Authenticate: the system allows the user to login into the application (mobile application) by providing a user name and a password pair and location.

Asset data importation: Each aircraft (or aircraft type) may have a specific set of assets that have associated data to be considered during the control process. This automatic retrieval guarantees obtaining the correct set of data related to the aircraft.

During a setup procedure, the technician (mobile application user) starts by scanning the aircraft bar code. The application sends a request to the server asking for the related data (e.g. an Assets set called an Assets MapData and the LOPA, which is an airplane Layout of Passenger Accommodation).

Received data allows a user to be able to proceed to further application steps. Once data is received, the user has the option to proceed to either "check" (perform a check process) or carry out an initial setup process.

Figure 12:
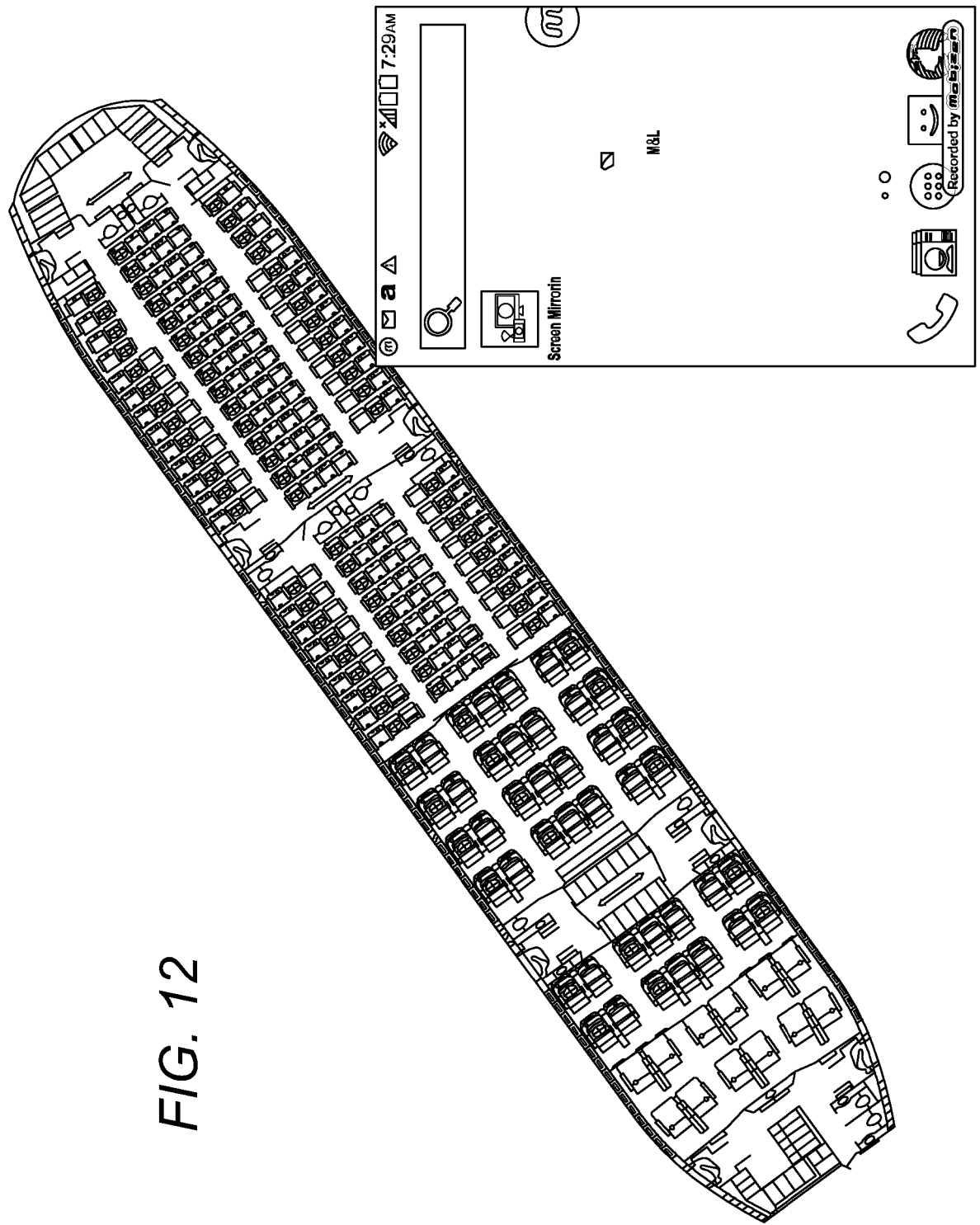
FIG. 12 shows a further aircraft layout, as displayed within the mobile application.

Intelligent asset tracking on LOPA: The application allows the user to obtain a graphical representation of asset distribution (e.g. orientation and location) within the aircraft LOPA (FIG. 12 shows such a layout, as displayed within the mobile application). A graphical view represents a real time scanned visual report providing a RTLS (Real Time Location System). The system manages and tracks the scan process by block. A block is a set of assets that is predefined on the server side.

The technician starts a global aircraft assets scan by selecting a scan button with the mobile app. Each asset has its own tag (e.g. one described above). The scanning process uses the system described above to locate each tagged asset. Calibration of the asset locations may also be carried out in advance, according to the method described earlier. The technician or user may walk through the aisle of the aircraft and progressively scan assets. Meanwhile, the application will display the scan result. For each scanned block, the technician is able to observe any detected inconsistencies (through color-coded pins or indicators on the LOPA map view displayed on a screen of the mobile device).

Red pin: The asset has not been detected within the predefined block. This asset is then considered as missing or the tag may be inoperative.

Orange: The asset has been detected within the predefined block but it is expired (each tag may have an associated expiry date).

Green pin: The asset is detected correctly (in its block) and has no associated expired action.

Grey pin: The asset is correctly detected but has an expired action associated with it and/or has an alert to indicate that expiry will occur within a specific predefined timeframe).

Depending on a scan result, the user may:

1. Restart the current scan (try to correct the missing scanned assets) by rescanning.
2. Continue the scan (it may be considered that an asset as missing by pressing ignore so that they may continue).

Scan Report: View a summary report of all inconsistencies that were detected from the "tracking by LOPA" use case scan. The application displays to the technician a list of missing & expired assets (assets that have an expired associated action—e.g. replace lifevest).

This list may be in read only mode (to prevent tampering or other interactions with the results).

The two inconsistencies types may be differentiated (e.g. using different colour codes):

Red line: missing asset.

Orange line asset with an expired associated action.

Grey line: asset that is near expiry (e.g. remaining 15 days or less to expiry—this may be programmable at the server).

Required Parts: The aim of this use case is to facilitate a resolution of any identified inconstancies. Fast inventory tracking may be enabled by grouping assets by part number.

Replace Assets: The objective of this is to resolve inconsistencies previously identified and listed in the required part use case. The technician selects (e.g. clicks on a screen) each list line and fill the new asset's details data correctly. EPC allows RFID scanning and entering row and position (e.g. seat number) manually. Barcodes of the replacement assets may be scanned to obtain their serial number or these data may be added manually. After the data is correctly entered or scanned in, the user confirms that the replacement has taken place, which caused an update to the particular aircraft asset status.

Initial Setup: The objective of this use case is to initiate an "initial setup" process by performing three different actions: configuration, verification 1 and verification 2. These actions are subject to initiate asset installation within the aircraft. The technician logs in using his credential. The technician identifies the location and navigates the user to the related view in order to initiate the process within the mobile application.

As will be appreciated by the skilled person, details of the above embodiment may be varied without departing from the scope of the present invention, as defined by the appended claims.

For example, other mechanical to electrical power generators may be used (e.g. flywheel or spring-based). Real time processing or data may be requested on demand. A super SMD capacitor may be used for fast charging and supply. Memory with extensible options may be used. Isotropic antennas may be used on the tags and/or readers. Commands may be sent from the reader to the tags through a controlled emitted signal. Reporting and monitoring within the tags may be carried out automatically on demand. Data may be read from and written to each tag from the tag reader. A specific or regulated energy amount may be harvested using vibrations and/or at the acoustic wavelength level. Additionally, solar energy may be used to power the tags). These power sources may be regulated using an AC/DC and/or DC/DC module and/or buck converter to charge a capacitor or super-capacitor or battery.

Each tag may be inside the EHWSN so they will be connected to the tag reader, which may be connected to the internet through (aircraft) buses or a GSM (e.g. fixed IP and port to a cloud server). Multiple antennas may be used within each tag (e.g. three) in order to provide different ranges, orientations, protocols, frequencies and/or other modes of communication. The tag energy source may switch between mechanical and RF (e.g. from the reader).

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for calibrating a tag location system comprising the steps of:
   placing one or more test radio frequency, RF, communication circuits at known locations within a space to be calibrated;
   receiving, at a calibration device, a signal from each one of the test RF communication circuit, wherein the signal is received from one or more movable tag readers;
   determining, by the calibration device, a location of the one or more tag readers when the signal is received, wherein the determined location is determined relative to a known location, and wherein the location of the one or more tag readers is determined from one or more sensors within the one or more tag readers;
   determining, by the calibration device, a property of each received signal, wherein the determined property is associated with the known location of the test RF communication circuit that generated the signal; and
   generating, by the calibration device, a model of the calibrated space from the determined properties of the each received signal and associated known locations, wherein the model provides an output indicating the location of a signal-producing tag based on signals received from the test RF communication circuits and associated known locations.

2. The method of claim 1, wherein the property of the received signal is any one or more of signal strength, amplitude, frequency, polarisation, and/or angle of arrival.

3. The method of claim 1 further comprising repeating the receiving, determining and generating steps after changes have occurred within the calibration space.

4. The method of claim 1, wherein generating the model includes one or more machine learning algorithms, wherein the machine learning algorithm is any one or more selected from: Bayesian classification, linear regression, logistic regression, neural networking and support vector machine.

5. A method for locating a tag having a radio frequency, RF, communication circuit configured to produce a signal, the method comprising the steps of:
   receiving from the tag a signal, wherein the signal is received from one or more movable tag readers;
   determining a location of the one or more tag readers when the signal is received, wherein the determined location is determined relative to a known location, and wherein the location of the one or more tag readers is determined from one or more sensors within the one or more tag readers;
   determining one or more signal properties of the received signal;
   providing the one or more determined signal properties as an input to a calibration model generated according to a method comprising:
      placing one or more test radio frequency, RF, communication circuits at known locations within a space to be calibrated,
      receiving, at a calibration device, a signal from each one of the test RF communication circuit;
      determining, by the calibration device, a property of each received signal, wherein the determined property is associated with the known location of the test RF communication circuit that generated the signal, and
      generating, by the calibration device, a model of the calibrated space from the determined properties of the each received signal and associated known locations, wherein the model provides an output indicating the location of a signal-producing tag based on signals received from the test RF communication circuits and associated known locations; and
   generating an output using the model, the output indicating the location of the tag.

6. The method of claim 1, wherein the one or more sensors is any one or more of an accelerometer and/or gyroscope.

7. The method of claim 1 further comprising the step of moving each one or more tag readers and receiving signals from the one or more test RF communication circuits after each move, wherein the location of the one or more tag readers is determined during or after the moving step.

8. The method of claim 5, wherein the one or more sensors is any one or more of accelerometer and gyroscope.

9. The method of claim 5 further comprising the step of moving the one or more tag readers and receiving signals from the tag after each move, wherein the location of the one or more tag readers is determined during the moving step, wherein the signal is received at more than one location using a plurality of tag readers.

10. A tracking system comprising:
one or more movable tag readers, each tag reader comprising an antenna configured to receive a radio frequency, RF, signal and determine one or more properties of each received signal and one or more sensors configured to generate data indicating a location or movement of the tag reader relative to a known location;
one or more radio frequency, RF, communication circuits configured to generate a signal to be received by the one or more tag readers;
a calibration device comprising one or more processors; and memory storing instructions causing the one or more processors of the calibration device to:
generate a calibration model of a space from the determined one or more properties of the each received signal and associated known locations of the RF communication circuits, wherein the model provides an output indicating the location of a tag based on signals received from the test RF communication circuits and associated known locations and the location or movement of the tag reader relative to the known location.

11. The system of claim 10, wherein the instructions further cause the one or more processors to:
provide one or more further determined signal properties from a tag signal as an input to the calibration model; and
generate an output using the calibration model, the output indicating the location of the tag.

12. The system of claim 10 further comprising:
a database configured to store the determined locations of tags and/or associated items attached to the tags; and
an internet interface configured to receive a query identifying a tag or item attached to the tag and in response provide a location of the tag or associated item.

13. The system of claim 10 further comprising a mobile device configured to receive an input indicating the location of the tag.

14. The system of claim 13 further comprising a server configured to provide data indicating aircraft layouts to the mobile device, wherein the input indicating the location of the tag corresponds with a location within the aircraft layout, wherein the server is further configured to store the location of one or more tags.

15. The system of claim 10, wherein the one or more tag readers further comprises one or more sensors configured to generate data indicating a location or movement of the tag reader.

16. The system of claim 15, wherein the one or more sensors is any one or more of an accelerometer and/or gyroscope, wherein the instructions further cause the one or more processors to determine the location of the one or more tag readers from the generated data when the signal is received.

17. The method of claim 16, wherein the location of the one or more tag readers is determined during and/or after the tag reader is moved to a new location.

* * * * *

UNITED STATES PATENT AND TRADEMARK OFFICE
CERTIFICATE OF CORRECTION

PATENT NO. : 10,969,469 B2
APPLICATION NO. : 16/308167
DATED : April 6, 2021
INVENTOR(S) : Safwan Kuzbari et al.

Page 1 of 1

It is certified that error appears in the above-identified patent and that said Letters Patent is hereby corrected as shown below:

On the Title Page

Item (73)
Please delete "Novus Communications LTD" and insert --NVS Technology Solutions LTD--.

Signed and Sealed this
Seventh Day of May, 2024

Katherine Kelly Vidal
*Director of the United States Patent and Trademark Office*